United States Patent
Mills

(10) Patent No.: US 10,282,704 B2
(45) Date of Patent: May 7, 2019

(54) SYSTEM AND METHOD FOR CONTROLLING SALE OF A COMPANY

(71) Applicant: Jerry L. Mills, Gilbert, AZ (US)

(72) Inventor: Jerry L. Mills, Gilbert, AZ (US)

(*) Notice: Subject to any disclaimer, the term of this patent is extended or adjusted under 35 U.S.C. 154(b) by 474 days.

(21) Appl. No.: 14/201,282

(22) Filed: Mar. 7, 2014

(65) Prior Publication Data

US 2015/0254612 A1  Sep. 10, 2015

(51) Int. Cl.
*G06Q 10/00* (2012.01)
*G06Q 10/10* (2012.01)
*G06Q 10/06* (2012.01)
*G06Q 40/06* (2012.01)

(52) U.S. Cl.
CPC ..... *G06Q 10/103* (2013.01); *G06Q 10/06311* (2013.01); *G06Q 10/063114* (2013.01); *G06Q 40/06* (2013.01)

(58) Field of Classification Search
CPC .................................................. G06Q 10/103
USPC ....................................................... 705/7.15
See application file for complete search history.

(56) References Cited

U.S. PATENT DOCUMENTS

| | | | | |
|---|---|---|---|---|
| 6,766,512 B1* | 7/2004 | Khosrowshahi | .......... | G06F 8/35 715/234 |
| 7,693,733 B2 | 4/2010 | Eder | | |
| 7,739,171 B2* | 6/2010 | Tilton | .................. | G06Q 40/025 705/36 R |
| 8,370,250 B2 | 2/2013 | Ballow et al. | | |
| 8,386,297 B2 | 2/2013 | Heyns et al. | | |
| 2002/0103730 A1* | 8/2002 | Perley | ..................... | G06Q 40/02 705/30 |
| 2002/0106613 A1* | 8/2002 | Takada | ................... | G09B 19/18 434/1 |
| 2003/0101120 A1* | 5/2003 | Tilton | .................. | G06Q 40/025 705/36 R |
| 2003/0172014 A1 | 9/2003 | Quackenbush et al. | | |
| 2004/0039676 A1* | 2/2004 | Trainer | .................. | G06Q 40/00 705/36 R |
| 2004/0122756 A1 | 6/2004 | Creeden et al. | | |

(Continued)

OTHER PUBLICATIONS

Robert F. Reilly & Robert P. Schweihs (The Handbook of Business Valuation and Intellectual Property Analysis, 2004).*

(Continued)

*Primary Examiner* — Hafiz A Kassim
(74) *Attorney, Agent, or Firm* — Booth Udall Fuller, PLC

(57) ABSTRACT

A computerized system and method for controlling sale of a company comprising identifying a target company sale value on a dashboard, identifying a current company value on the dashboard based on an Earnings Before Interest Taxes Depreciation and Amortization (EBITDA) analysis, assigning tasks for reducing a difference between the target company sale value and the current company value, displaying on the dashboard a reduction between the target company sale value and the current company value, and authorizing sale of the company when the target company sale value equals a current company value. An adjusted company value can be calculated based on additions and deductions. A current company value can be calculated as a product of the adjusted company value and a multiplier. A difference between the target company sale value and the current company value can be reduced by completing tasks contained within a plurality of checklists.

9 Claims, 19 Drawing Sheets

(56) References Cited

U.S. PATENT DOCUMENTS

| | | | |
|---|---|---|---|
| 2004/0128174 A1 | 7/2004 | Feldman | |
| 2004/0158479 A1* | 8/2004 | Adhikari | G06Q 10/10 705/59 |
| 2004/0249657 A1* | 12/2004 | Kol | G06Q 10/10 705/36 R |
| 2005/0209948 A1* | 9/2005 | Ballow | G06Q 10/06 705/36 R |
| 2006/0282380 A1 | 12/2006 | Birney et al. | |
| 2008/0004924 A1 | 1/2008 | Cao et al. | |
| 2008/0071598 A1 | 3/2008 | Masuyama et al. | |
| 2010/0153300 A1 | 6/2010 | Kolton et al. | |
| 2010/0161383 A1* | 6/2010 | Butler | G06Q 10/04 705/28 |
| 2010/0262563 A1* | 10/2010 | Arnott | G06Q 40/00 705/36 R |
| 2011/0231214 A1 | 9/2011 | Chang et al. | |
| 2013/0013379 A1 | 1/2013 | Carter | |

OTHER PUBLICATIONS

John T. Phillips (Mergers, Acquisitions, Divestitures and Closures Records and Information Management Checklists, Mar. 2011).*
David Laro and Shannon P. Pratt et al. (Business Valuation and Taxes: Procedure, Law, and Perspective, ISBN-13 978-0-4716-9437-3, 2005). (Year: 2005).*
http://www.mbaware.com/busvalsof.html, Business Valuation Software, MBAWare—The Business Software Source, Nov. 4, 2013.
http://www.business-valuations.biz/faq.asp, Business Valuations, Business-Valuations.biz, Nov. 4, 2013.
http://sellabilityscore.com/en#started, The Sellability Score, Built to Sell, Inc., Nov. 6, 2013.
http://moneysoft.com/business-valuation-software/, MoneySoft Business Valuation Specialist: Program Overview, MoneySoft, Inc., Nov. 4, 2013.
http://www.businessbookpress.com/, Business Book Press, Professors Introduce Valuation Software, BusinessBookPress.com/BizPricer.com, A Division of RDS Associates, Inc.,Nov. 4, 2013.

* cited by examiner

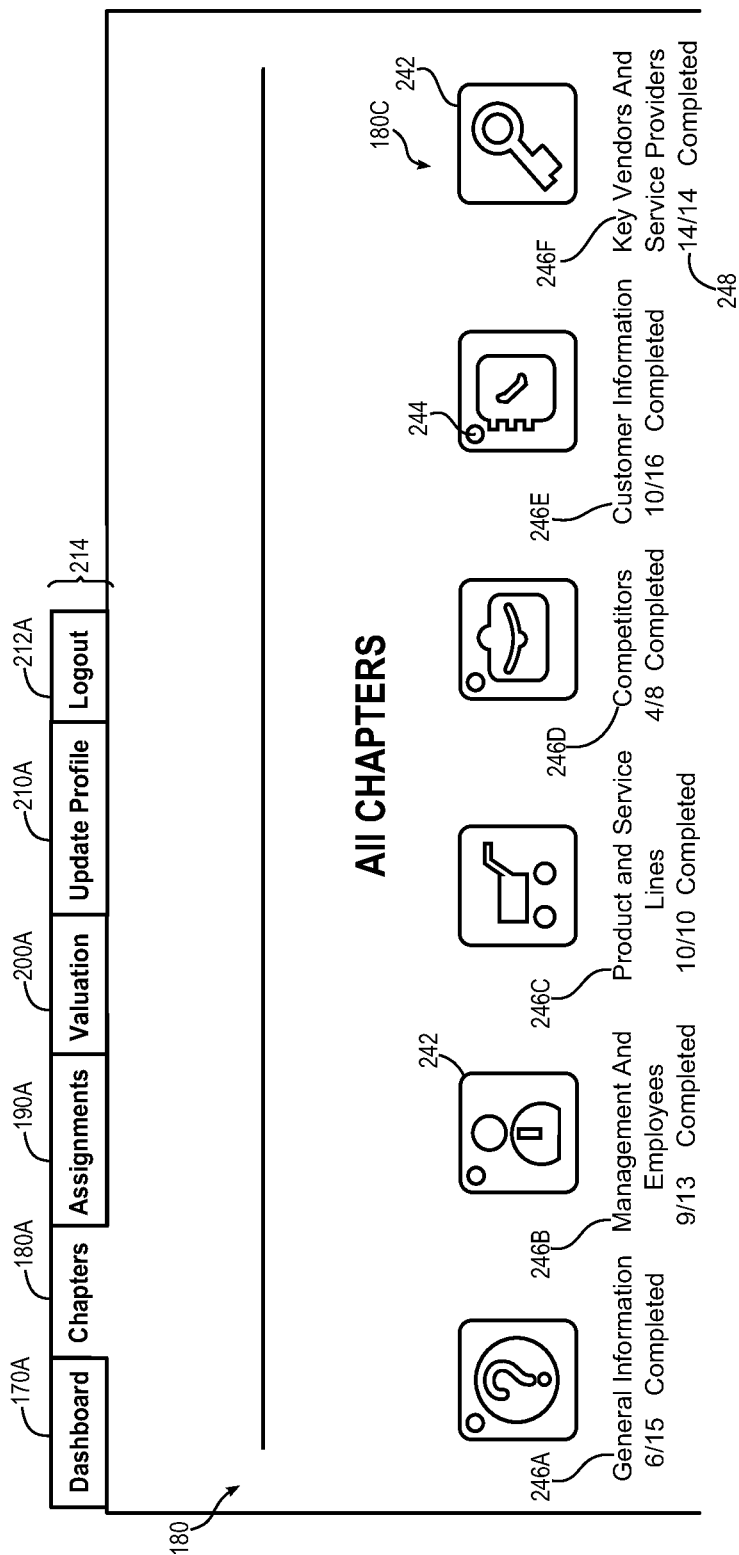
FIG. 4A1

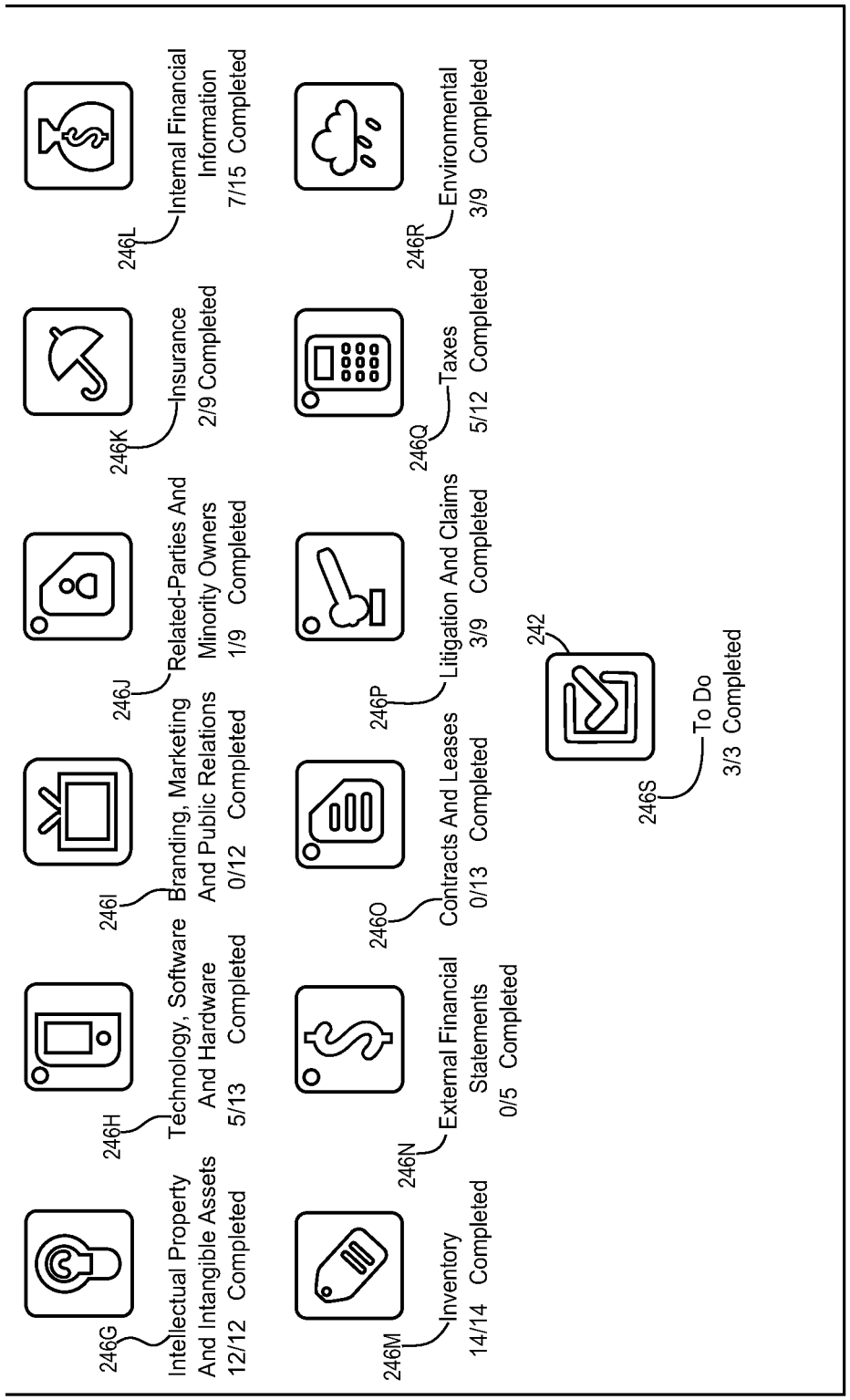
FIG. 4A2

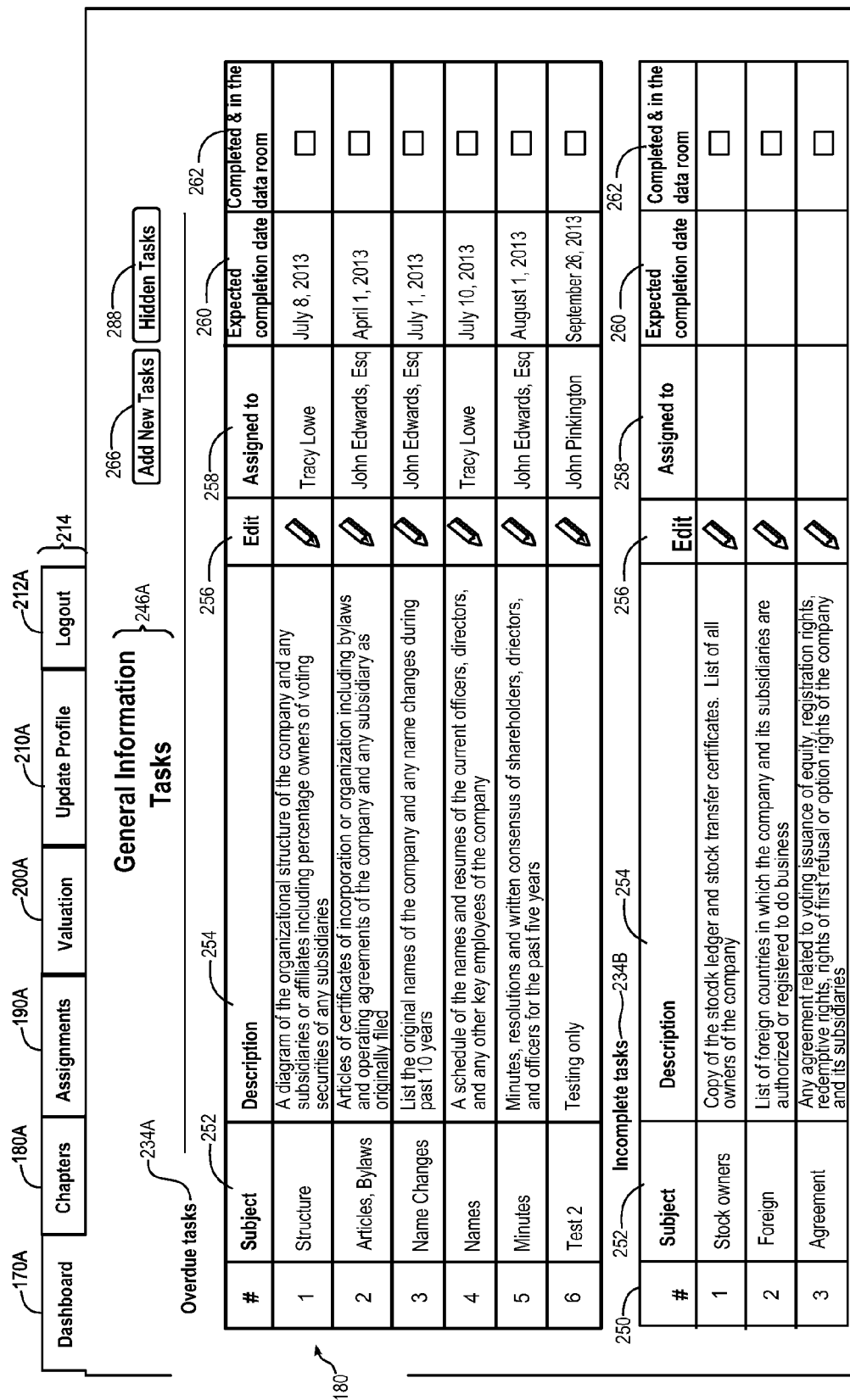
FIG. 4B1

Completed tasks — 234C

| # | Subject | Description | Edit | Assigned to | Expected completion date | Completed & in the data room |
|---|---------|-------------|------|-------------|--------------------------|-------------------------------|
| 1 | Buy-Sell | Copy of all buy-sell agreements and any owner agreements | ✏ | | | ☑ |
| 2 | Options | A schedule of all options, warrants, rights, and any other potentially dilutive securities with exercise prices and vesting options | ✏ | | | ☑ |
| 3 | DBA & AKA | List any DBA (doing business as) AKA (also known as) and any fictitious name filings for the past 10 years | ✏ | | | ☑ |
| 4 | Locations | List all locations the company has operated in during the past 10 years | ✏ | | | ☑ |
| 5 | Rights | List the rights of each class of stock or owners interests | ✏ | | | ☑ |
| 6 | Number | List the number of authorized and issued stock or owners interests | | | | ☑ |

Chapters — 180

- General information 6/15 — 246A
- Product and Service Lines 10/10 — 246C
- Customer Information 10/16 — 246E
- Intellectual Property and Intangible Assets 12/12 — 246G
- Branding, Marketing and Public Relations 0/12 — 246I
- Insurance 2/9 — 246K
- Inventory 14/14 — 246M
- Contracts and Leases 0/13 — 246O
- Taxes 6/12 — 246Q
- To Do 3/3 — 246S
- Management and Employees 9/13 — 246B
- Competitors 4/8 — 246D
- Key Vendors and Service Providers 14/14 — 246F
- Technology, Software, and Hardware 5/13 — 246H
- Related-Parties and Minority Owners 1/9 — 246J
- Internal Financial Information 7/15 — 246L
- External Financial Statements 0/6 — 246N
- Litigation and Claims 3/9 — 246P
- Environmental 3/9 — 246R

| Dashboard | Chapters | Assignments | Valuation | Update Profile | Logout |
|---|---|---|---|---|---|
| 170A | 180A | 190A | 200A | 210A | 212A |

214

General Information
Tasks

Add New Tasks    Hidden Tasks

Overdue tasks

| # | Subject | Description | Expected completion date | Completed & in the data room |
|---|---|---|---|---|
| 1 | Structure | A diagram of the org subsidiaries or affilia securities of any sub | 8, 2013 | ☐ |
| 2 | Articles, Bylaws | Articles of certificate and operating agree originally filed | 1, 2013 | ☐ |
| 3 | Name Changes | List of original name 10 years | 1, 2013 | ☐ |
| 4 | Names | A schedule of the na and any other key e | 10, 2013 | ☐ |
| 5 | Minutes | Minutes, resolutions officers for the past f | st 1, 2013 | ☐ |
| 6 | Test 2 | Testing only | er 26, 2013 | ☐ |

Edit Task ☒

Subject: Structure — 282A
Description: A diagram of the organizational structure of the company and any subsidiaries or affiliates — 282B
Ending Date: 2013-07-08 — 282C
Assign To: Tracy Lowe — 282D
Status: ● In Progress  ○ Completed & in the data room  ○ n/a — 282E Save — 284

Incomplete tasks — 280

| # | Subject | Description | cted pletion date | Completed & in the data room |
|---|---|---|---|---|
| 1 | Stock owners | Copy of the stock ledger and stock transfer certificates. List of all owners of the company | | ☐ |
| 2 | Foreign | List of foreign countries in which the company and its subsidiaries are authorized or registered to do business | | ☐ |
| 3 | Agreement | Any agreement related to voting issuance of equity, redemptive rights, rights of first refusal or option rights of the company and its subsidiaries | | ☐ |

FIG. 4D

| Dashboard | Chapters | Assignment | Valuation | Update Profile | Logout |

CALCULATE THE COMPANY SALE VALUE

Adjusted EBITDA and Valuation Calculation (See Page 59 of Exit Strategy Handbook)

| | Beginning Value<br>Last Updated 30 June 2012 | Latest Value<br>Last Updated 30 June 2014 |
|---|---|---|
| EBITDA | $74,014 | $400,000 |
| Additions: | | |
| Legal, reorganization, audit and appraisal costs to prepare for the sale of the business | $10,000 | $105,000 |
| Salaries of family members who are not expected to continue working for the buyer | $125,000 | $135,000 |
| One-time bonuses paid for a nonrecurring and unusual transaction | $75,000 | $0 |
| Officer life and disability insurance that will not continue after the sale | $25,000 | $30,000 |
| Legal and other costs to buy out minority owners of the company | $80,000 | $70,000 |
| Country club fees and season tickets to the Chicago Cubs | $25,000 | $30,000 |
| Vehicles, education and other expenses for three family members | $45,000 | $55,000 |
| Inventory or scrap sold in cash and not deposited into the company's bank account | $0 | $50,000 |

Enter new addition here

FIG. 6A1

| | | See examples below |
|---|---|---|
| 342 — Deductions: | | |
| 344 — Increase in the cost of the person that will replace the owner/manager | 344A — ($50,000) | 344B — ($60,000) |
| 346 — Rent paid to the owner below market value for an equivalent building | 346A — ($45,000) | 346B — ($0) |
| 348 — Below-market salaries paid to key employees that are expected to continue with the buyer | 348A — ($40,000) | 348B — ($15,000) |
| 350 — Excessive compensation to owners, management and employees | 350A — ($25,000) | 350B — ($10,000) |
| 352 — Enter new deduction here | | |
| 356 — Adjusted EBITDA | 356A — $299,014 | 356B — $790,000 |
| 358 — Multiplier | 358A — × [ 4 ▶ ] | 358B — × [ 4 ▶ ] |
| 359 — Estimated value | 218 — $1,196,056 | 220 — $3,160,000 |
| Difference | | 222 — ⇧ $1,963,944 |

Additions and Deductions

Below is a list of potential descretionary items in the Income Statement that may be Adjustments to EBITDA. These adjustments may be either increases or decreases to EBITDA and may have a material impact on the valuation of the business: See pages 54-56 of The Exit Strategy Handbook.

FIG. 6A2

| Dashboard | Chapters | Assignments | Valuation | Update Profile | Logout |
|---|---|---|---|---|---|
| 170A | 180A | 190A | 200A | 210A | 212A |

214

CALCULATE THE COMPANY SALE VALUE

Adjusted EBITDA and Valuation Calculation (See Page 59 of Exit Strategy Handbook)

| | Beginning Value | Latest Value |
|---|---|---|
| | Last Updated 30 June 2012 | Last Updated 30 June 2014 |
| EBITDA | $74,014 | $400,000 |
| Additions | | |
| Legal, re... | $25,000 | $30,000 |
| Salaries | $80,000 | $70,000 |
| One-time... | $25,000 | $30,000 |
| Officer life and disability insurance that will not continue after the sale | $45,000 | $55,000 |
| Legal and other costs to buy out minority owners of the company | $0 | $50,000 |
| Country club fees and season tickets to the Chicago Cubs | | |
| Vehicles, education and other expenses for three family members | | |
| Inventory or scrap sold in cash and not deposited into the company's bank account | | |

360 — Edit Valuation

Beginning Value: $ 74,014 — 320A

Latest Value: $ 400,000 — 320B

[ Save ]

Enter new addition here

SYSTEM AND METHOD FOR CONTROLLING SALE OF A COMPANY

TECHNICAL FIELD

This disclosure relates to a system and method for controlling a sale of a company.

BACKGROUND

Owners of closely-held companies will not maintain ownership of their companies forever, and as such require a plan or exit strategy regarding how the owner will transition away from business ownership, business involvement, or both. Often, owners of closely-held companies have an exit strategy of selling their businesses as a way to liquidate assets invested with the business. Currently, in the United States (US) owners of closely-held companies represent about 8% of the population in the United States, and collectively employ between about 60% and 70% of all US employees.

For a portion of these owners of closely-held companies, a large percentage of the owners' assets are found in the companies they own. As such, the owners' have a substantial vested interest in a sale of their companies, whether the sale be to a third party, shareholders in an employee stock ownership plan (ESOP), company management, or some other type of buyer.

Current demographics in the US indicate that there are approximately 78 million baby boomers that are arriving at retirement age. These baby boomers are believed to own more than about 10 million businesses, many of whom will be interested in selling their businesses in the near future. The sale of a large number of businesses, including those businesses owned by baby-boomers, is expected to create an increased supply of businesses for sale on the open market, which will tend to decrease sale prices of those businesses and make sale of those businesses more difficult.

SUMMARY

Accordingly, a need exists for controlling a sale of a company in order to optimize the sale of the company for the owner. In an embodiment, a method for controlling sale of a company can comprise storing in a database a target company sale value, and a current company value. The method can further include receiving by a computerized user device assignments for reducing a difference between the target company sale value and the current company value. The method can further include displaying by the computerized user device a dashboard further displaying progress in reducing a difference between the target company sale value and the current company value and authorization for sale of the company when the target company sale value equals a current company value.

The method for or controlling the sale of the company can further comprise determining the current company value based on an Earnings Before Interest Taxes Depreciation and Amortization (EBITDA) analysis comprising storing in the database an EBITDA, receiving by the computerized user device, additions to the EBITDA, deductions to the EBITDA, and a multiplier, and displaying by the computerized user device a current company value, wherein the current company value is a product of an adjusted EBITDA and the multiplier, wherein the adjusted EBITDA further comprises the EBITDA plus additions and minus deductions. The method can further include receiving assignments by the computerized user device further includes creating assignments by, completing a general information checklist, completing a management and employees checklist, completing a product and service lines checklist, completing a competition checklist, completing a customer information checklist, completing a key vendors and service providers checklist, completing an intellectual property and intangible assets checklist, completing a technology software and hardware checklist, completing a marketing branding and public relations checklist, completing a related parties and minority owners checklist, completing an insurance checklist, completing an internal financial information checklist, completing an inventory checklist, completing an external financial statements checklist, completing a contracts and leases checklist, completing a litigation and claims checklist, completing a taxes checklist, and completing an environmental checklist. The method can further comprise storing in the database tasks from within the plurality of checklists, receiving by the computerized user device assignments of named parties to complete tasks from within the plurality of checklists by a completion date, and displaying by the computerized user device on the dashboard an increase in value of the company based on completion of the assigned tasks. The method can further comprise receiving reports from the named parties with respect to the assignments to complete the tasks from within the plurality of checklists. The method can further comprise receiving by computerized user device an adjustment to the multiplier based on a potential buyer, and displaying on the dashboard authorization for sale of the company when the multiplier used reflects an actual buyer. The method can further comprise displaying on the dashboard active status updates of the tasks, and displaying on the dashboard links to descriptive material that corresponds to the active status updates of the tasks.

In another aspect, a computerized system for controlling sale of a company can comprise a database configured to store a target company sale value, and a current company value. The computerized system can further comprise a computerized user device configured to receive assignments for reducing a difference between the target company sale value and the current company value; wherein the computerized user device comprises a dashboard configured to display progress in reducing a difference between the target company sale value and the current company value, and authorization for sale of the company when the target company sale value equals a current company value.

The computerized system for or controlling the sale of the company can further comprise the database configured to store an EBITDA value, additions to the EBITDA, deductions to the EBITDA, and a multiplier. The computerized system can further comprise the computerized user device being configured to determine the current company value based on the EBITDA analysis and display a current company value, wherein the current company value is a product of an adjusted EBITDA and the multiplier, and wherein the adjusted EBITDA further comprises the EBITDA plus additions and minus deductions.

The computerized system can further comprise the computerized user device being configured to receive assignments for completing tasks contained within a general information checklist, a management and employees checklist, a product and service lines checklist, a competition checklist, customer information checklist, a key vendors and service providers checklist, an intellectual property and intangible assets checklist, a technology software and hardware checklist, a marketing branding and public relations checklist, a related parties and minority owners checklist, an insurance checklist, an internal financial information checklist, an inventory checklist, an external financial statements checklist, a contracts and leases checklist, a litigation and claims checklist, a taxes checklist, and an environmental checklist. The computerized system can further comprise the database being configured to store the plurality of checklists, and the computerized user device being configured to receive assignments of named parties to complete tasks from within the plurality of checklists by a completion date, wherein the dashboard is configured to display an increase in value of the company based on completion of the assigned tasks. The computerized system can further comprise the computerized user device being configured to receive reports from the named parties with respect to the assignments to complete the tasks from within the plurality of checklists. The computerized system can further be configured to receive an adjustment to the multiplier based on a potential buyer, and display on the dashboard authorization for sale of the company when the multiplier used reflects an actual buyer. The computerized system can further be configured for the dashboard to display active status updates of the tasks, and links to descriptive material that corresponds to the active status updates of the tasks.

In another aspect, a method for controlling sale of a company can comprise identifying a target company sale value on a dashboard, identifying a current company value on the dashboard based on an Earnings Before Interest Taxes Depreciation and Amortization (EBITDA) analysis, assigning tasks for reducing a difference between the target company sale value and the current company value, displaying on the dashboard a reduction between the target company sale value and the current company value, and authorizing sale of the company when the target company sale value equals a current company value.

The method for or controlling the sale of the company can further comprise determining additions to the EBITDA, determining deductions to the EBITDA, determining a multiplier, calculating an adjusted company value as the current company value based on the EBITDA analysis plus additions and minus deduction, and calculating current company value as a product of the adjusted company value and the multiplier. The method can further comprise reducing a difference between the target company sale value and the current company value by completing a plurality of checklists to identify tasks for reducing the difference, the plurality of checklists comprising a general information checklist, a management and employees checklist, a product and service lines checklist, a competition checklist, a customer information checklist, a key vendors and service providers checklist, an intellectual property and intangible assets checklist, a technology software and hardware checklist, a marketing branding and public relations checklist, a related parties and minority owners checklist, an insurance checklist, an internal financial information checklist, an inventory checklist, an external financial statements checklist, a contracts and leases checklist, a litigation and claims checklist, a taxes checklist, and an environmental checklist. The method can further comprise assigning individuals to complete the tasks identified for reducing the difference between the target company sale value and the current company value, wherein each assigned task further comprises an expected completion date. The method can further comprise adjusting the multiplier based on potential buyers, and authorizing sale of the company when the multiplier used reflects an actual buyer. The method can further comprise providing the dashboard with active status updates of the tasks identified for reducing the difference between the target company sale value and the current company value, and providing the dashboard with links to descriptive material that corresponds to the active status updates of the tasks.

Aspects and applications of the disclosure presented here are described below in the drawings and detailed description. Unless specifically noted, the words and phrases in the specification and the claims should be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, the inventor's intent and desire is that the simple, plain, and ordinary meaning of the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain and ordinary English meaning to those skilled in the applicable arts as set forth above.

Further, the inventors are fully informed of the standards and application of the special provisions of 35 U.S.C. § 112(f). Thus, the use of the words "function," "means," or "step" in the Description, Drawings, or Claims is not intended to somehow indicate a desire to invoke the special provisions of 35 U.S.C. § 112(f), to define the invention. To the contrary, if the provisions of 35 U.S.C. § 112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material, or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed disclosure, it is intended that the disclosure not be limited only to the specific structure, material, or acts that are described in the preferred embodiments, but in addition, include any and all structures, materials or acts that perform the claimed function as described in alternative embodiments or forms of the invention, or that are well known present or later-developed, equivalent structures, material, or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 4A1-4D depict features of an embodiment of a chapters component.

FIGS. 6A1-6D depict features of an embodiment of a valuation component.

DETAILED DESCRIPTION

Figure 1A:
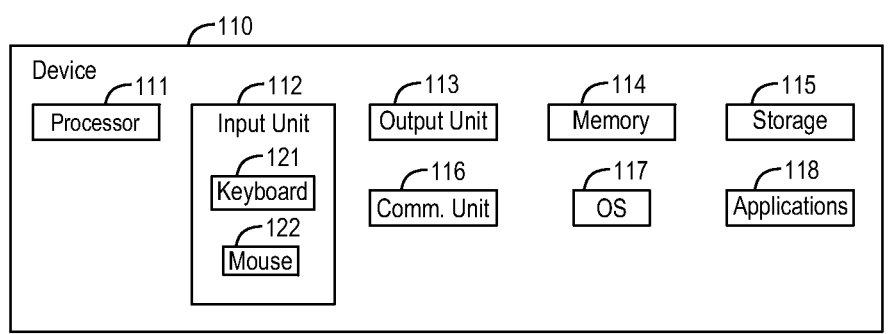
FIGS. 1A and 1B are block diagrams of a computer device.

In the following description, and for the purposes of explanation, numerous specific details are set forth in order to provide a thorough understanding of the various aspects of the invention. However, those skilled in the relevant arts will understand that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices, and technologies to which the disclosed inventions may be applied. The full scope of the invention is not limited to the examples that are described below.

The word "exemplary," "example," or various forms thereof, are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The following disclosure provides implementations of a system and method of controlling a sale of a company, which may be utilized on mobile devices or other traditional computerized interfaces capable of providing a user interface including a web-based user interface. The disclosure of the present application is related to the contents of "The Exit Strategy Handbook The BEST Guide for Selling Your Business" by Jerry L. Mills, ISBN 978-0-9886932-1-1, the contents of which are incorporated in their entirety by this reference. The implementations disclosed herein provide a user 100 with controls to optimize a sale price of a business and ways to track and control of the optimization until sale of the business is finalized.

FIG. 1A schematically illustrates a block diagram of a device or computerized user device 110, that includes for example, a desktop computer, a Personal Computer (PC), a laptop computer, a notebook computer, a net book, a tablet computer, a Personal Digital Assistant (PDA) device, a cellular phone, a mobile phone, a hybrid device (e.g., combining one or more cellular phone functionalities with one or more PDA device functionalities), a portable device having a touch-screen, a relatively small computing device, a non-desktop computer or computing device, a portable device, a handheld device, a Consumer Electronic (CE) device, or any other appropriate computerized devices known to one of ordinary skill in the art. In some embodiments, device 110 may include non-mobile computing devices, such as, for example, a desktop computer, a PC, or a server computer. In some embodiments, device 110 may be implemented using suitable hardware components and/or software components, for example, a processor 111, an input unit 112, an output unit 113, a memory unit 114, a storage unit 115, and a communication unit 116.

Processor 111 can include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of an Operating System (OS) 117 or of one or more applications 118.

Input unit 112 can include, for example, a keyboard 121, a keypad, a mouse 122, a touch-pad, a touch-screen, a joystick, a track-ball, a stylus, a microphone, and/or other suitable pointing unit or input device. Output unit 113 can include, for example, a monitor, a screen, a touch-screen, a Cathode Ray Tube (CRT) display unit, a Liquid Crystal Display (LCD) display unit, a plasma display unit, one or more audio speakers or earphones, or other suitable output devices.

Memory unit 114 can include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units.

Storage unit 115 can include, for example, a hard disk drive, a floppy disk drive, a Solid-State Disk (SSD), a Compact Disk (CD) drive, a CD-ROM drive, a Digital Versatile Disk (DVD) drive, an internal or external database or repository, or other suitable removable or non-removable storage units. Memory unit 114 and/or storage unit 115, for example, store data processed by device 110.

Communication unit 116 can include, for example, a wired or wireless transceiver, a wired or wireless modem, a wired or wireless Network Interface Card (NIC), a wired or wireless communication adapter, or other unit suitable for transmitting and/or receiving communication signals, blocks, frames, transmission streams, packets, messages and/or data. Optionally, communication unit 116 includes, or is associated with, one or more antennas or one or more sets of antennas.

In some embodiments, some or all of the components of device 110 are enclosed in a common housing or packaging, and are interconnected or operably associated using one or more wired or wireless links. In other embodiments, some components of device 110 may be distributed among multiple or separate devices or locations. Device 110 can operate individually without connection, interconnection, or communication to other devices 110 as part of a network or larger system. Conversely, as discussed below with respect to FIG. 1B, device 110 can be connected, interconnected, or in communication with other devices similar to device 110.

Figure 1B:
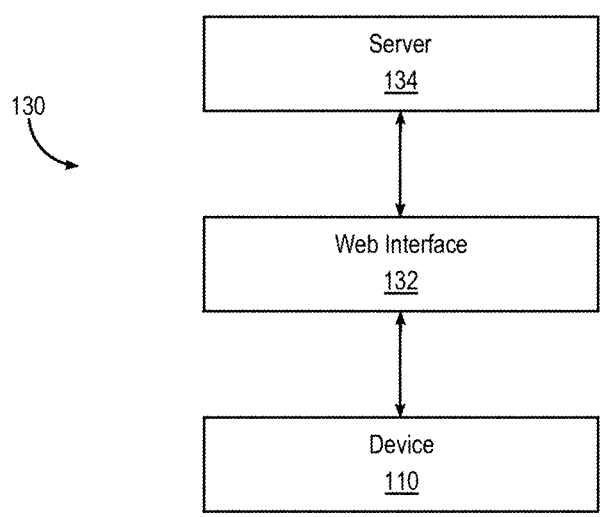

FIG. 1B schematically illustrates a block diagram of a system 130 in which device 110 is interconnected or operably associated with server 134 (or one or more additional devices 110) using web interface 132. System 130 and device 110 can be operated or manipulated by user 100, which includes a person, individual, business, group, or entity that owns, operates, utilizes or is otherwise associated with system 130 or device 110.

Figure 2:
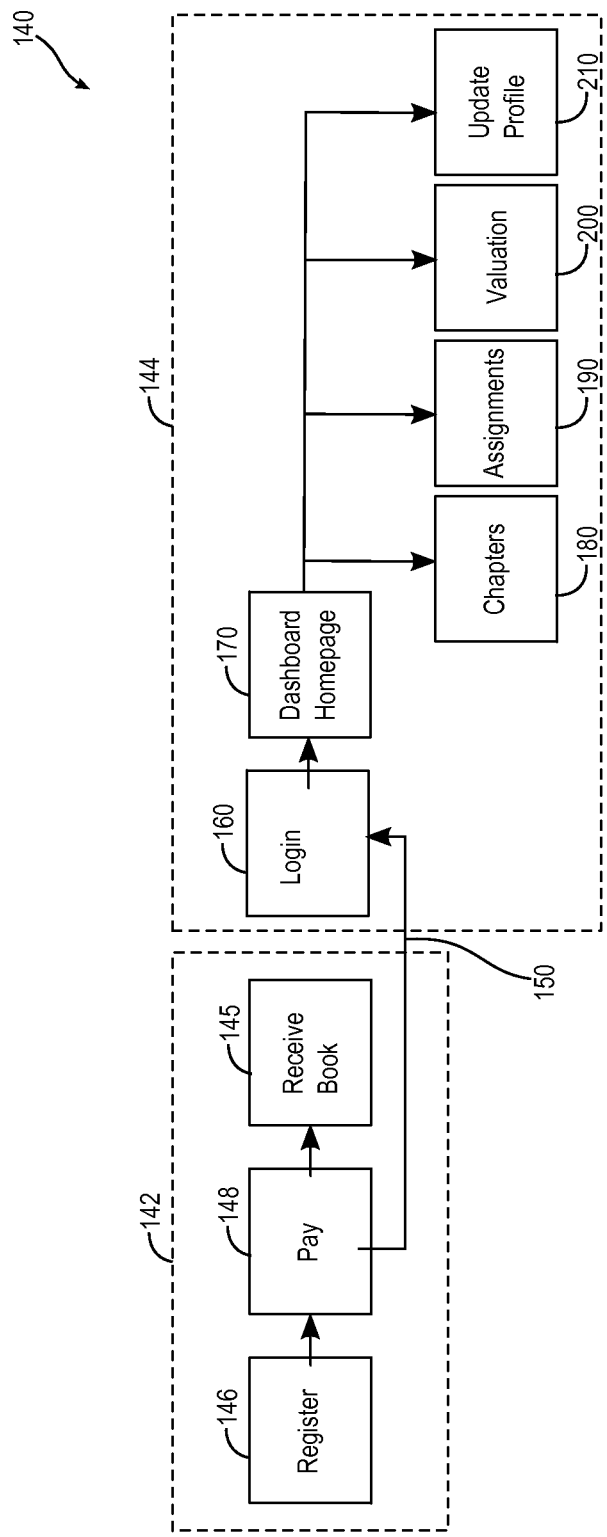
FIG. 2 depicts a block diagram of a system or method for controlling sale of a business.

FIG. 2 schematically illustrates a block diagram, flow chart, or wireframe of a system or method 140 for controlling sale of a business. System 140 can optionally include a written component 142, a computer-based component 144, or both. While system 140 is described herein with respect to both written component 142 and computer-based component 144, a person having ordinary skill in the art will understand that the various features, components, or steps described with respect to system 140 can be interchangeably performed or facilitated with or without an electronic and software based medium.

Written component 142 of system 140 allows for the acquisition of material that can include printed literature, verbal instruction, in person or remote training, digital or electronic text comprising written instructions, or other suitable communications. In an embodiment, written component 142 provides for the acquisition of a book 143 by completing a registration component 146 and a payment component 148. Registration component 146 allows user 100 provide information to a seller, which can be provided in person, on-line through a website, via mail, or through another suitable process. Information collected during registration 146 can include such items as a company name, a business address, a name of the business owner or chief executive officer (CEO), a name of a preferred contact person if different from the owner/CEO, and contact information for the preferred contact person such as a phone number and e-mail address.

User 100 can then provide payment as part of payment component 148. Upon payment, user 100 can then receive the desired information requested as part of written component 142, such as by receiving the ordered book 145. Additionally, when system 140 comprises both written component 142 and computer-based component 144, completion of payment component 148 can automatically create an account within computer-based component 144. In an embodiment, upon completion of payment component 148, user 100 can be automatically directed by transfer feature 150 from pay component 148 to login process 160 that will provide user 100 access to computer-based component 144. Login process 160 can occur at a different website or location than where registration component 146 and payment component 148 occur. Login process 160 can initially, or at a first user visit, include establishing a user selected username or user identification (ID) and a password associated with the username. By correctly entering the username and password, user 100 gains secured access to computer-based component 144 of system 130. User 100 can input profile information into the second website or computer-based component 144, or alternatively the information entered during registration with written component 142 can be automatically incorporated or input into the computer-based component. In either event, user 100 can subsequently update his profile and contact information from within computer-based component 144, using, for example, update profile component 210. Within update profile component 210, user 100 can update previously entered or incorporated material, and add, delete, or modify text, logos, pictures, data fields, links (including hyperlinks), or other information. Upon finishing the desired tasks within computer-based component 144, user 100 can navigate to logout component 212, where the user can leave the secured computer-based component 144.

FIG. 2 illustrates a flow-chart for computer-based component 144 of system 130 that comprises a variety of components, features, or pages included as part of a software or web-base application that is made available after user 100 completes a login procedure, such as entering a username and password. Computer-based component 144 of system 130 can be accessed by device 110 as a computer implemented stand alone software application, or as a web-based program included as part of an integrated system or network as described above with respect to FIGS. 1A and 1B. As a non-limiting example, various components, features, or pages included within system 140 can include a dashboard or homepage component 170, chapters component 180, assignments component 190, valuation component 200, and profile update component 210, each of which is discussed in greater detail below with respect to FIGS. 3-6D.

Figure 3A:
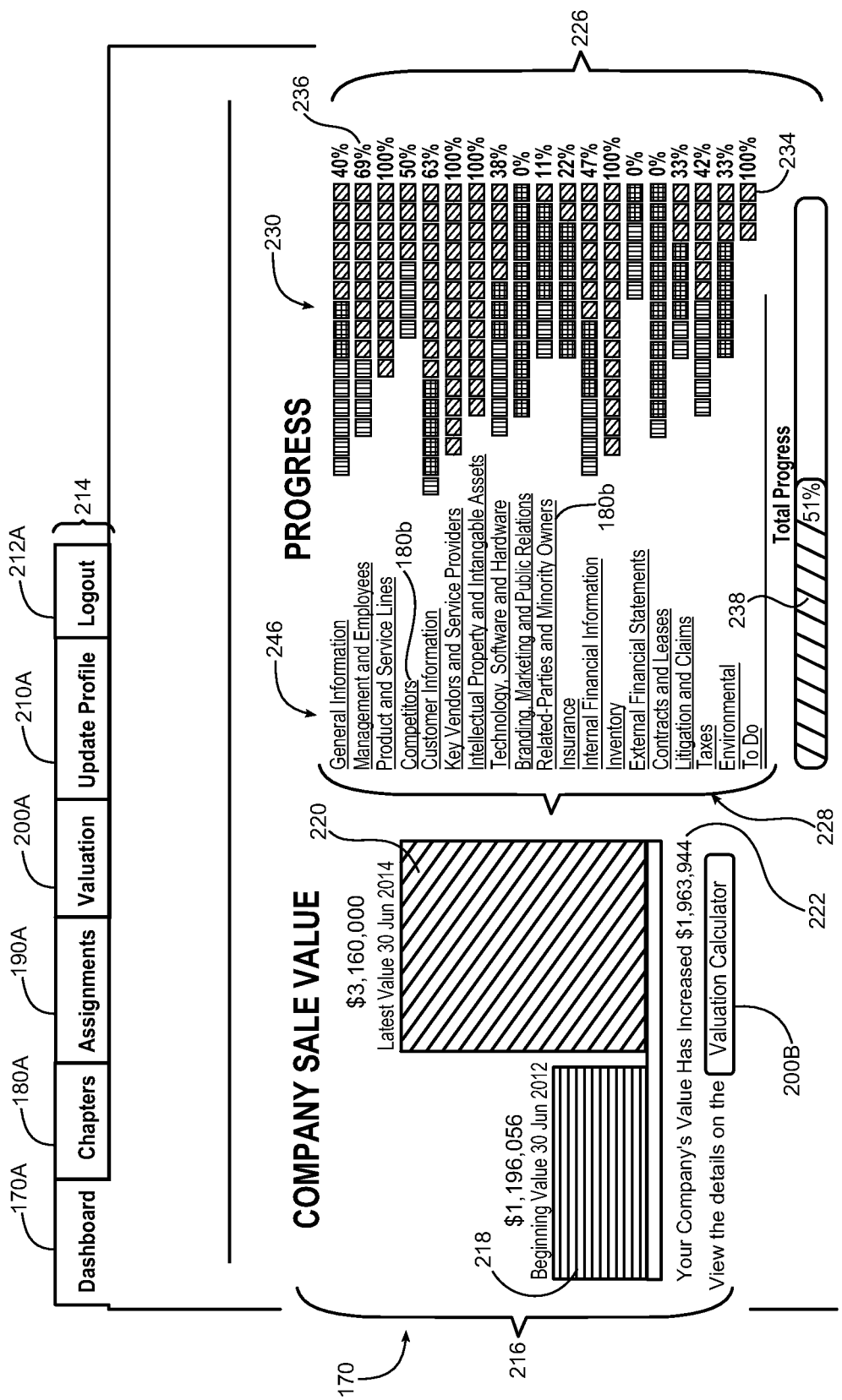
FIGS. 3A and 3B depict an embodiment of a dashboard component.
Figure 3B:
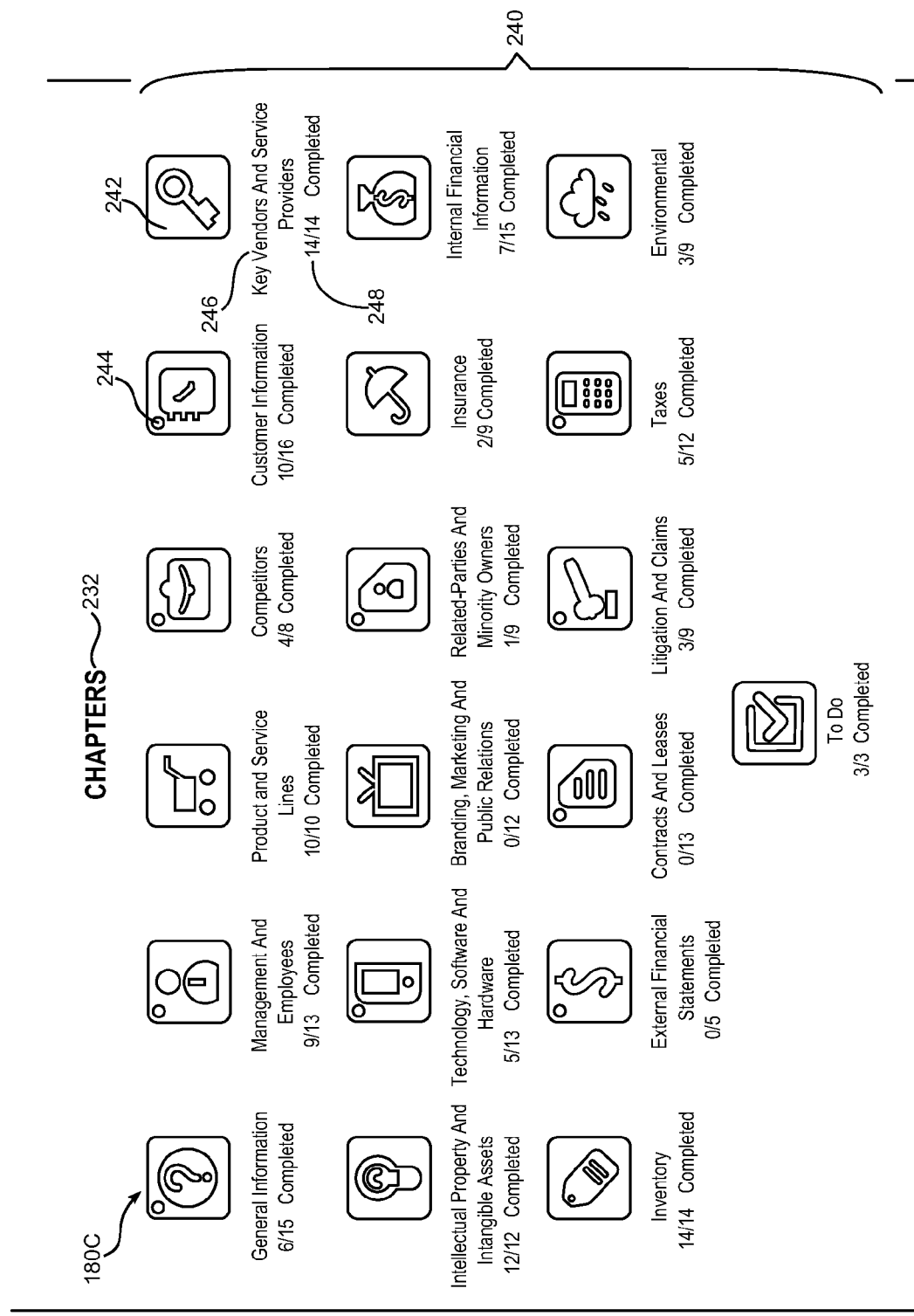

FIG. 3 provides additional detail with respect to dashboard 170 shown previously in FIG. 2. Dashboard 170 can be accessed by user 100 upon successfully logging into computer-based component 144. In an embodiment, user 100 can be automatically directed to dashboard component 170. Dashboard component 170 can be software or a page or portion of software that allows user 100 to quickly determine overall progress in a method of controlling sale of a business. Dashboard 170 can include tabs, links, or hyperlinks 214 that allow user 100 to navigate between various components of computer-based component 144. Tabs 214 can include, without limitation, link to dashboard component 170a, link to chapters component 180a, link to assignments component 190a, link to valuation component 200a, link to profile update component 210a, and link to logout component 212a.

Dashboard component 170 presents information in a way that is easily accessible and easy to understand for user 100. Accordingly, user 100 can quickly ascertain, among other things: (i) a current value of a particular company, (ii) an overall indication of a percentage of completed tasks or assignments before sale of the company, (iii) a percentage of completed tasks on each individual project to be completed before sale of the company, (iv) which individuals have assigned and uncompleted tasks with impending deadlines, for example, anyone who has fewer than 30 days to complete their project, (v) names of individuals who are past due on deadlines for assigned tasks, and (vi) a condition and content of documents stored in a secured location or data room within or accessible from computer-based component 144. The information presented in dashboard 170 can be presented as part of a preconfigured arrangement or a according to a custom format determined by a preference of user 100. As discussed in greater detail below, FIG. 3 illustrates an exemplary arrangement of how various information can be presented in dashboard 170.

Dashboard 170 can include a company sale value module 216 that can include a beginning or original company value 218, a current or latest company value 220, a projected or future company value, and an amount of increased value 222 experienced by the company, wherein increased value 222 is equal to a difference between current company value 220 and beginning company value 218. Company sale value module 216 can be presented graphically in the form of a graph, such as a bar graph, line graph, pie graph, scatter plot, or other suitable form to easily and efficiently convey the information contained within company sale value module 216 to user 100. A link 200b, similar to link 200a, can be included to valuation component or valuation calculator 200. Link 200b can be included within company sale value module 216 that allows user 100 to easily navigate from dashboard 170 to valuation component 200 to gain additional detail regarding company value and the basis for arriving at the values or information presented in company sale module 216.

Dashboard 170 can also include a progress module 226 comprising a summary of chapter titles 246 and a total progress graph 230. Chapter title summary 228 can include a listing of one or more of the chapters 232 covered in book 143, including chapter titles 246 and corresponding tasks 234 for each chapter discussed in book 143. Tasks 234 can be presented graphically in the form of a graph, such as a bar graph, line graph, pie graph, scatter plot, or other suitable form within chapter task summary 230 to easily and efficiently convey to user 100 which tasks 234 have been completed, which tasks are incomplete, which tasks are being worked on, which tasks are behind schedule, or other similar information.

In an embodiment, color can be associated with each task 234 such that a green color indicates a task 234 has been completed, a yellow color indicates a task 234 for a particular chapter 232 is progressing towards completion, and a red color indicates that a task 234 has not been begun or is behind schedule. Each chapter 232 listed within progress module 226 and chapter title summary 228 can be configured as a link or hyperlink 180b to chapters component 180, which allows user 100 to easily navigate from dashboard 170 to chapters component 180 or a particularly relevant chapter 232 within chapters component 180 to gain additional detail regarding a particular task 234, details related to progress of a particular task 234, or a list of tasks 234 for a specific chapter title 246.

Additionally, progress module 226 can comprise a total progress bar 238 that visually presents a graphical indication, whether in the form of a graph, such as a bar graph, line graph, pie graph, scatter plot, or other suitable form that easily and efficiently conveys to user 100 an overall status update or total progress towards having all tasks 234 from each chapter 232 completed, or an overall status update of total progress towards having latest or current company value 220 match a desired sale price.

Dashboard 170 can also include a chapters module 240 comprising links 180c to particular chapters 232 of chapters component 180. Chapters module 240 can be a comprehensive list of all chapters 232, or can be a list comprising less than an entirety of chapters 232, which are selected by user 100 to highlight only those chapters of particular relevance that user 100 wishes to monitor from dashboard 170. Links 180c can be formatted as a chapter icon 242 to provide a visual cue to user 100 regarding content of a particular chapter 232. Images used with icons 242 can correspond to images or graphics incorporated within book 143 or printed material or content associated with or presented as part of written component 142. Adjacent to, or in conjunction with, icons 242, an indicator 244 can denote whether any tasks 234 from a particular chapter 232 are incomplete. Alternatively, indicator 244 can denote whether all tasks 234 have been completed for a particular chapter 232. In an embodiment, color can be associated with indicators 244 such that a green color can indicate that all assignments 234 have been completed while a red color can indicate that all tasks 234 have not been completed for a particular chapter 232.

Adjacent to, or in conjunction with, icons 242, a title, heading, or subject 246 of each chapter 232 can be included to convey a general topic or theme of a chapter 232 to user 100. In an embodiment, title 246 can be configured as a link 180c, either alone or together with icon 242. Adjacent to, or in conjunction with, icons 242 and/or titles 246, a task complete thumbnail 248 can be included to convey in writing a number of tasks 234 completed relative to a total number of tasks 234 for each chapter 232. In an embodiment, task complete thumbnail 248 can be configured as a link 180c, either alone or together with icon 242 and title 246. Links 180c can provide easy access to additional content and information contained within chapters 232 and can also direct user 100 to written material, such as that contained in book 143, which is discussed in greater detail below with reference to FIGS. 4A-4D.

The information contained within dashboard 170 and displayed to user 100 can be automatically updated to reflect a real-time or current status of the underlying information presented summarily on the dashboard. Furthermore, updates or changes to information on any of tabs 214 can be shown or reflected on any or all of remaining tabs 214, such that information shared among tabs 214 or any pages within computer-based component 144 can be linked and automatically updated among portions of the computer-based component. Accordingly, when a user updates information with respect to any of the other tabs 214 included within computer-based component 144, the update is reflected not only on the relevant tab 214, but on dashboard 170 as well. Dashboard 170 can comprise indications of: a target company sale value, a current company value, assignments for reducing a difference between the target company sale value and the current company value, and progress in reducing a difference between the target company sale value and the current company value such that control is exercised over sale of a company.

Figure 4C:
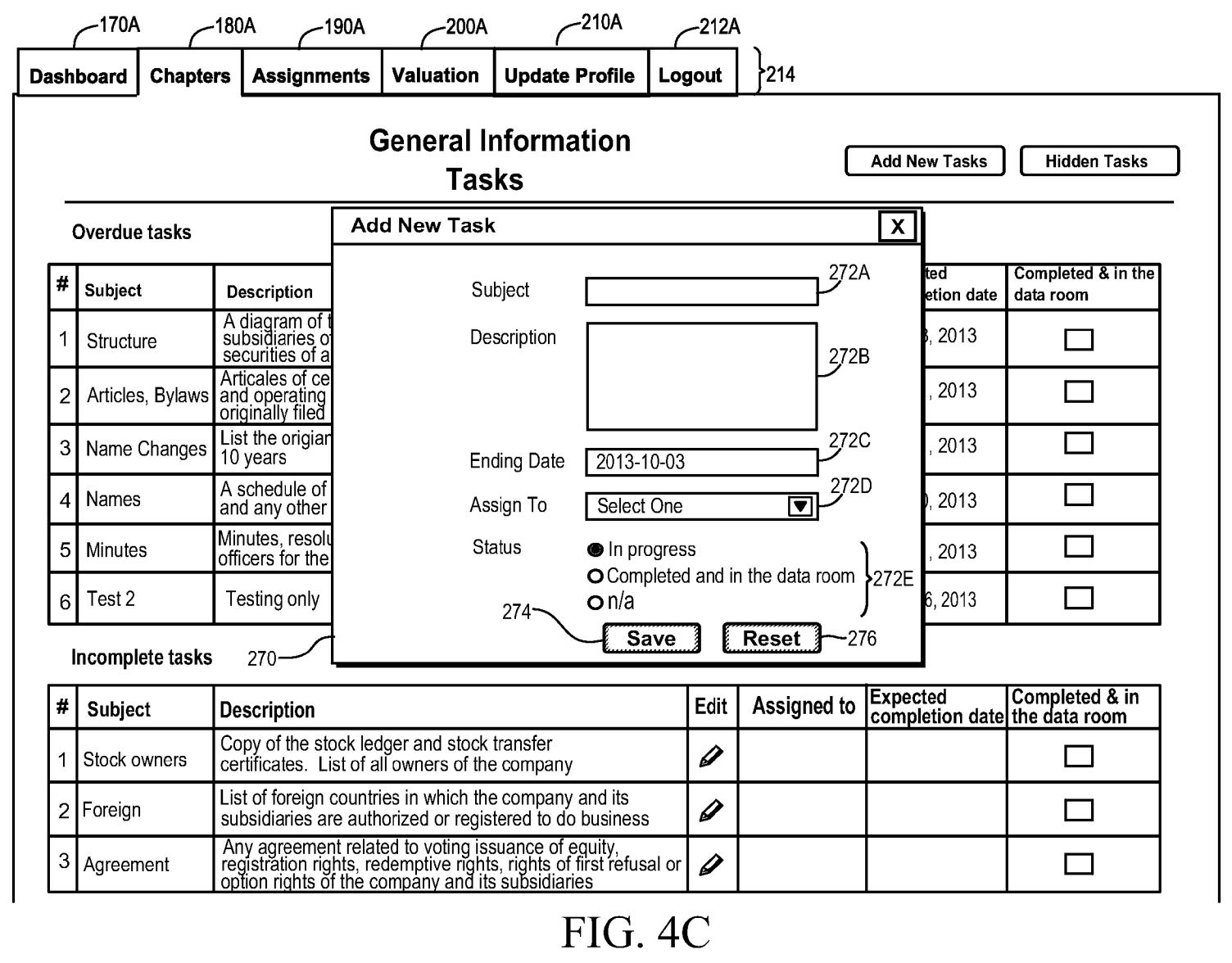

FIGS. 4A-4D provide additional detail with respect to chapters component 180 shown previously in FIGS. 2 and 3. Chapters component 180, as shown in FIG. 4A, can be accessed by user 100 from tabs 214, or from a link to chapters component 180 such as links 180a, 180b, or 180c. Chapters component 180, similar to a chapters module 240 from dashboard 170, provides an overview of links 180c to particular chapters 232 of chapters component 180. Links 180c can be formatted as chapter icons 242 to provide a visual cue to user 100 regarding content of a particular chapter 232. Images used with icons 242 can correspond to images or graphics incorporated within book 143 or printed material or content associated with or presented as part of written component 142. Adjacent to, or in conjunction with, icons 242, an indicator 244 can denote whether any tasks 234 from a particular chapter 232 are incomplete. Alternatively, indicator 244 can denote whether all tasks 234 have been completed for a particular chapter 232. In an embodiment, color can be associated with indicators 244 such that a green color can indicate that all assignments 234 have been completed, a yellow color can indicate that at least some assignments 234 are incomplete, and a red color can indicate that completion of tasks 234 for a particular chapter 232 are behind schedule.

Adjacent to, or in conjunction with, icons 242, title 246 of each chapter 232 can be included to convey a general topic or theme of a chapter 232 to user 100. Titles 246 can be based on chapter titles in book 143 and can also be named for a checklist of tasks corresponding to a given topic. As a non-limiting example, chapters module 180 can comprise titles 246 for chapters 232 including: title 246a for a General Information Checklist, title 246b for a Management and Employee Checklist, title 246c for a Product and Service Lines Checklist, title 246d for a Competition or Competitors Checklist, title 246e for a Customer Information Checklist, title 246f for a Key Vendors and Service Providers Checklist, title 246g for an Intellectual Property and Intangible Assets Checklist, title 246h for a Technology Software and Hardware Checklist, title 246i for a Marketing Branding and Public Relations Checklist, title 246j for a Related Parties and Minority Owners Checklist, title 246k for an Insurance Checklist, title 246l for an Internal Financial Information Checklist, title 246m for an Inventory Checklist, title 246n for an External Financial Statements Checklist, title 246o for a Contracts and Leases Checklist, title 246p for a Litigation and Claims Checklist, title 246q for a Taxes Checklist, title 246r for an Environmental Checklist, and title 246s for a To Do Checklist.

FIG. 4B provides an example of additional detail that can be contained within chapter component 180 for each title 246 shown in FIG. 4A and each title 246 shown in chapter module 240 of FIG. 3. Specifically, FIG. 4B shows additional detail for title 246a for a General Information Checklist comprising a number of tasks 234, which are also shown in FIG. 3. The additional detail for title 246a for a General Information Checklist can be accessed by user 100 from tabs 214, or from a link to chapters component 180 such as links 180a, 180b, or 180c, as described above. Tasks 234 contained within title 246a for a General Information Checklist for computer-based component 144 can be identical to the tasks included in the corresponding chapter of book 143. As a non-limiting example, tasks 234 can be subdivided into different classifications such as overdue tasks 234a, incomplete tasks 234b, completed tasks 234c, or other suitable classifications. Furthermore, each task 234 can be presented as part of a table including additional information for each task 234, including a task number 250, a subject 252, a description 254, and edit icon or link 256, an assigned to indicator 258, an expected completion date 260, a completion indicator 262, and other suitable information customizable to a preference of user 100.

Task number 250, assigned for each task 234, can be sequentially numbered according to a total number of tasks 234 contained with each particular chapter title 246. Alternatively, task numbers 250 can be based on a subset of tasks 234 such as overdue tasks 234a, incomplete tasks 234b, and completed tasks 234c. When task numbers 250 are based on a subset of tasks 234, numbering can be automatically updated as tasks are reclassified among different subsets of tasks 234. For example, overdue task 6 of subject "Test 2" could be numbered as incomplete task number 4 until an expected completion date is passed without the task being completed. Upon missing the completion date, the "Test 2" task could automatically be moved and renumbered from task number 4 under incomplete tasks 234b to task number 6 of overdue tasks 234a.

Subject 252 and description 254 provide indications of a subject and description, respectively, for each task 234. An entirety or a number less than an entirety of tasks 234 can be part of each chapter title as default tasks that are generic to each user 100 upon establishing computer-based component 144. Alternatively, subject 252 and description 254 of a task 234 can be edited or added by user 100. A new task 234, including subject 252 and description 254 can be added by engaging a function of adding a new task, which can be accomplished, for example, by user 100 clicking, selecting, or activating Add New Tasks button 266. Of course, a person of ordinary skill in the art will understand that engaging the function of adding a new task is not limited to clicking an icon, and that other methods of engaging a function are likewise contemplated. A process of a adding an additional task is described in greater detail with respect to FIG. 4C. Similarly, an existing task 234 can be edited by engaging a function of editing a new task, which can be accomplished, for example, by user 100 clicking, selecting, or activating edit icon 256. Of course, a person of ordinary skill in the art will understand that engaging the function of editing an existing task is not limited to clicking icon 256, and that other methods of engaging a function are likewise contemplated. A process of a adding an additional task is described in greater detail with respect to FIG. 4D.

For each task 234, an assigned indicator 258, an expected completion date 260 and a completion indicator 262 can also be included as part of chapters component 180 for each chapter title 246. Assigned indicator 258 can show a responsible party to which the task has been assigned or delegated. Expected completion date 260 can be a deadline generated by user 100 indicating a goal or desired time for completion of a particular task 234, or alternatively, can be a date provide by the responsible party indicated in "Assigned to" column 258.

Assigning a responsible person or party and a completion date is discussed in greater detail below with respect to subsequent FIGS. With regard to completion indicator 262, user 100 can mark or change the status of a task 234 to indicate that a task 234 has been completed and the appropriate documentation, records, or both are included in a data room 268. An entirety or a portion less than an entirety of data room 268 can exist within computer-based component 144, such as being in an electronic or digital form. Alternatively, an entirety or a portion less than an entirety of data room 268 can exist physically and contain for example printed documents and files stored in physical space. In some embodiments data room 268 can comprise both computer and physically based document. In either case, user 100 has access to, and control of, documents or deliverables indicated or produced by the relevant task 234.

FIG. 4C provides an example of additional detail for how user 100 can add a new task 234. As indicated above, user 100 can activate or click on add new task icon 266, which can cause add new task window 270 to appear. Add new task window 270 allows user 100 to enter relevant or desired information for the new task, including information previously discussed in relation to elements 250-262. The new information can be entered into designated fields or data entry points 272. Fields 272 can be pre-programmed or can be customizable by user 100 to change the pre-programmed content to add new fields or remove existing fields. Fields 272 can be shown simultaneously as part of a single add new task window 270, or alternatively, fields 272 can appear sequentially, one after another within one or more windows 270. Upon entry of data into fields 272, user 100 can save the changes for the new task, for example, by activating save button 274. Additionally, user 100 can also activate reset button 276 to clear the contents of fields 272 within window 270, or to return reset data entered for a given task from a current condition to a previous condition such as a default condition.

FIG. 4D provides an example of additional detail for how user 100 can edit an existing task 234. As indicated above, user 100 can activate or click on edit task icon 266, which can cause edit task window 280 to appear. Edit task window 280 allows user 100 to edit or change information for the selected task 234, including information previously discussed in relation to elements 250-262. The new information can be entered into designated fields or data entry points 282. Fields 282 can be pre-programmed or can be customizable by user 100 to change the pre-programmed content to add new fields or remove existing fields. Fields 282 can be shown simultaneously as part of a single add new task window 280, or alternatively, fields 282 can appear sequentially, one after another within one or more windows 280. Upon entry of data into fields 282, user 100 can save the changes for the edited task, for example, by activating save button 284.

User 100 can also move a task 234 to a hidden page so that the task is not displayed with the other tasks 234 for a particular chapter title 246. User 100 can view hidden tasks 234 by selecting or activating hidden tasks icon or link 288, which can direct to the user to a new page or interface within chapter component 180 that displays hidden tasks 234. Alternatively, upon activating the hidden tasks icon 288, hidden tasks 234 can be displayed on a same page as non-hidden tasks.

Figure 5A:
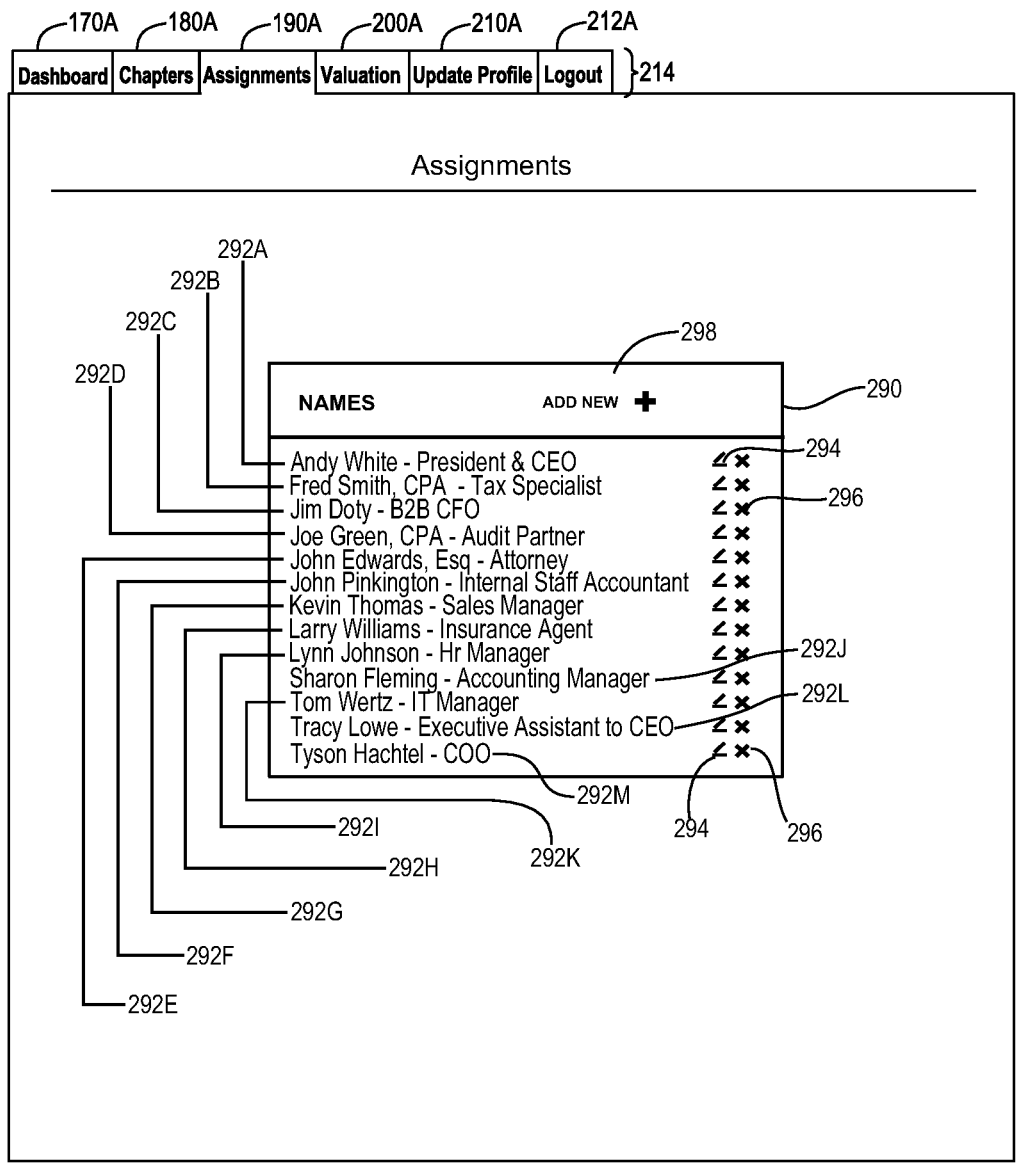
FIGS. 5A-5C depict features of an embodiment of an assignments component.
Figure 5B:
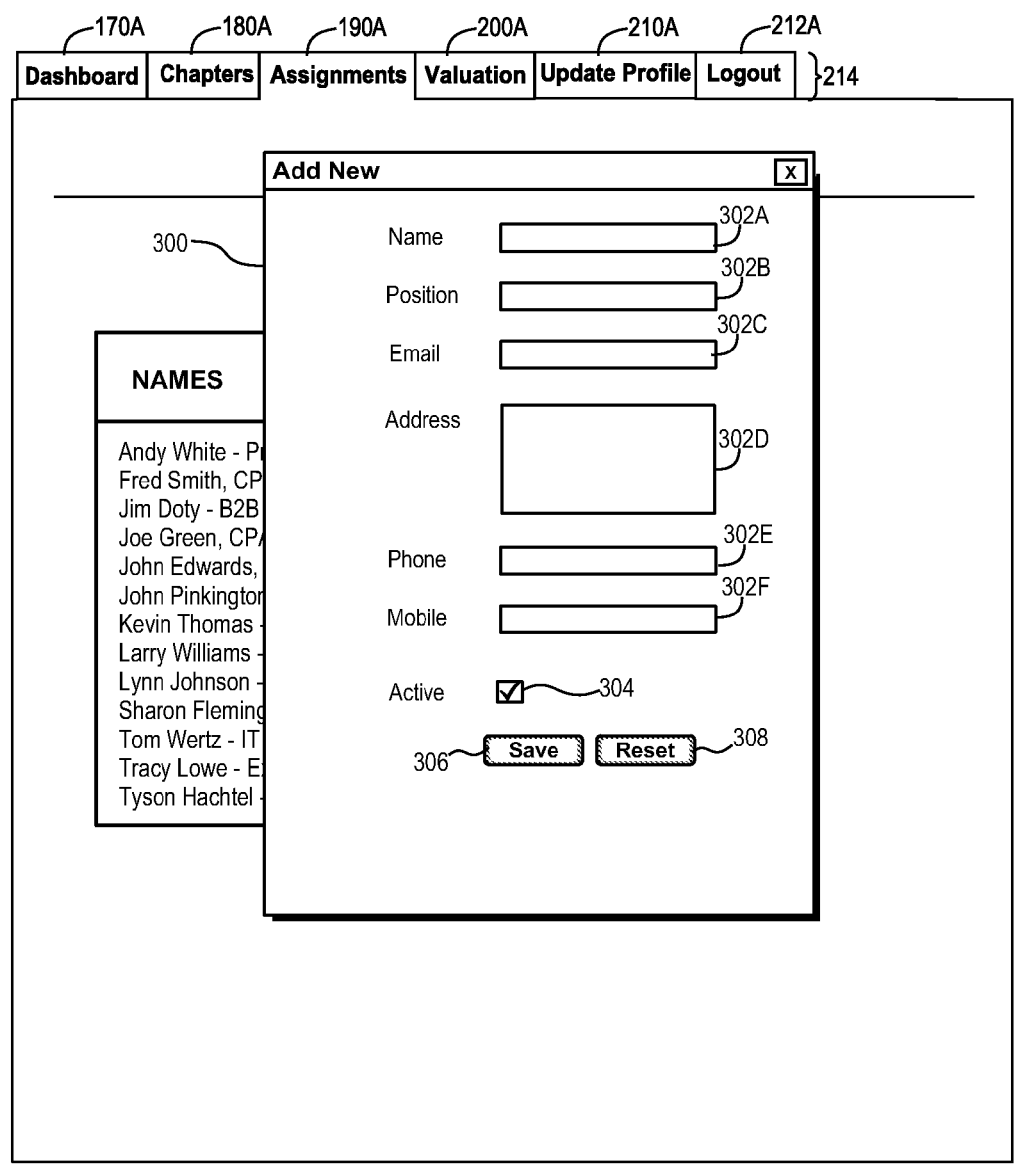
Figure 5C:
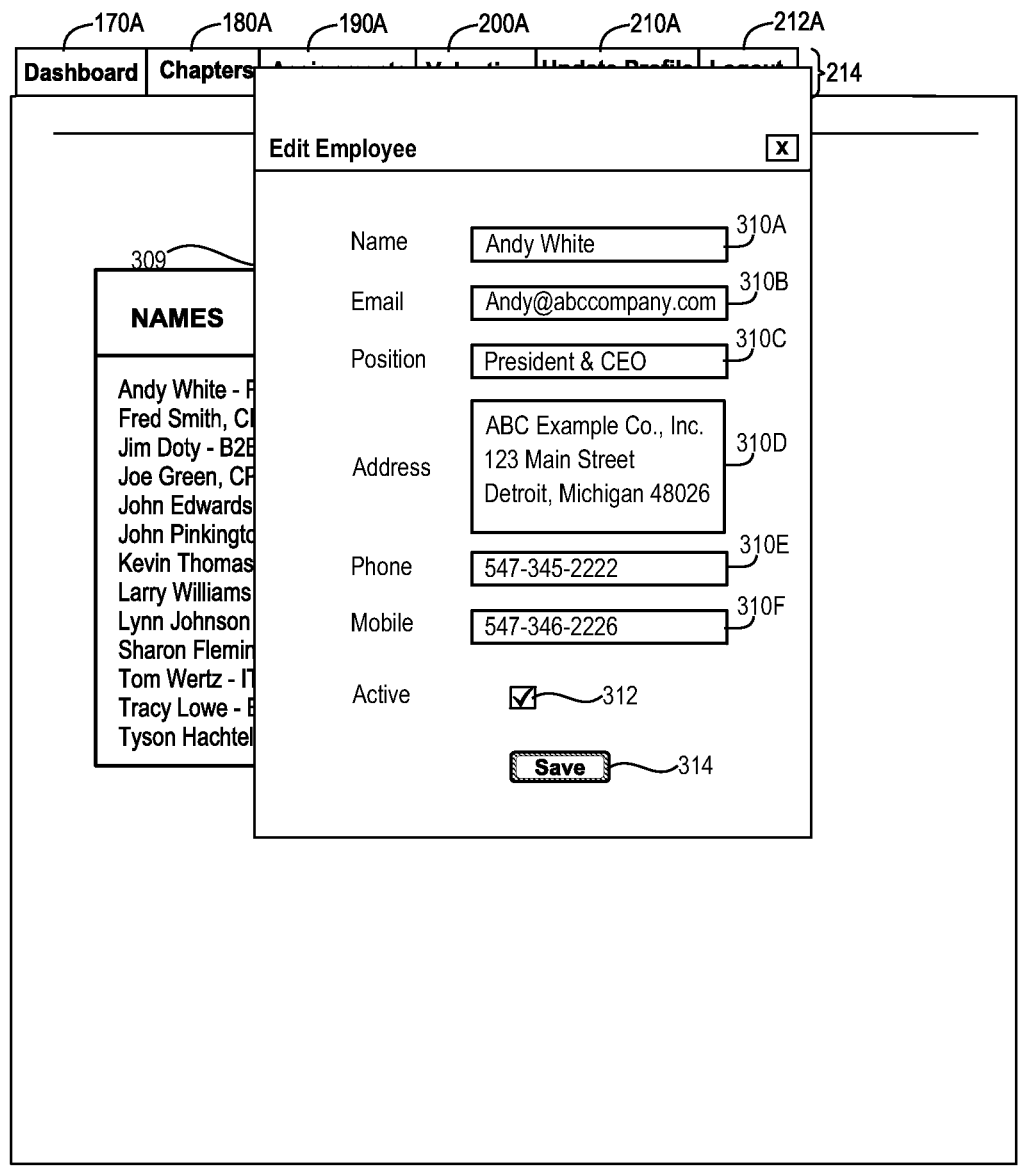

FIGS. 5A-5C provide additional detail with respect to assignments component 190 indicated previously in FIG. 2. Assignments component 190 can be accessed by user 100 from tabs 214 to edit the parties available for receiving assignments. As shown in FIG. 5A, assignments component 190 can include a list 290 of names 292 for individuals or organizations that are available to be assigned to tasks 234 within chapters component 180. In an embodiment, user 100 can customize or determine what information will be displayed in list 290. FIG. 5A illustrates a non-limiting example in which a name of an individual and a title or company name for the individual cab also be provided.

List 290 also allows an existing name 292 to be edited by engaging a function of editing an existing name 292, which can be accomplished, for example, by user 100 clicking, selecting, or activating edit icon or link 294. Of course, a person of ordinary skill in the art will understand that engaging the function of editing an existing name 292 is not limited to clicking icon 294, and that other methods of engaging a function are likewise contemplated. A process of editing an existing name 290 is described in greater detail with respect to FIG. 5C.

List 290 also allows an existing name 292 to be deleted by engaging a function of deleting an existing name 292, which can be accomplished, for example, by user 100 clicking, selecting, or activating delete icon or link 296. Of course, a person of ordinary skill in the art will understand that engaging the function of deleting an existing name 292 is not limited to clicking icon 296, and that other methods of engaging a deleting function are likewise contemplated.

A new name 292 can be added by engaging a function for adding a new name, which can be accomplished, for example, by user 100 clicking, selecting, or activating add new name icon or link 298. Of course, a person of ordinary skill in the art will understand that engaging the function of adding a new name 292 is not limited to clicking icon 298, and that other methods of engaging a function are likewise contemplated. A process of a adding an additional name is described in greater detail with respect to FIG. 5B.

As shown in FIG. 4C, names 292 from list 290 provide a list of individuals and companies capable of receiving assignments. Names 292 can be assigned tasks 234 by user 100, for example, by having user 100 select a name from list 290 from a drop down menu in field 272d shown in FIG. 4C or field 282d shown in FIG. 4D that provides names 292 from list 290 as an option for receiving a particular task 234. By pairing name 292 to a particular task 234, the party named becomes responsible for completing the assigned task by expected completion date 260. The party identified by name 292 can be notified by directly communicating with user 100 or through an automated communication or notification. The automated communications can include identifying a responsible party of an assignment when the responsible party logs onto computer-based component 144 and receives a notification, or alternatively (or additionally) by receiving an automated message, e-mail, text, voicemail, note, or other suitable electronic or physical message. By assigning tasks 234 from chapters 232 to named parties 292, specific actions are identified and controlled for reducing a difference between the target company sale value and the current company value. Accordingly, a sale value of the company is controlled by increasing a value of the company from the current company value to the target company sale value through a method of: completing tasks from select chapter titles by assigning named parties 292 to complete tasks 234 by an expected completion date 260, measuring an increase in the value of the company based on completion of the tasks, and controlling sale of the company by selling the company when current company value is equal to the target company sale value. Advantageously, user 100 can receive reports from named parties 292 assigned responsibility for specific tasks 234.

FIG. 5B provides an example of additional detail for how user 100 can add a new name 292 to list 290. As indicated above, user 100 can activate or click on add new icon 298, which can cause add new window 300 to appear. Add new window 300 allows user 100 to enter relevant or desired information for new name 292, including information added to fields 302, which can include, without limitation, a name, position, e-mail address, physical or mailing address, and phone number(s) for home, office, or mobile telephones. The new information can be entered into designated fields or data entry points 302. Fields 302 can be pre-programmed or can be customizable by user 100 to change the pre-programmed content to add new fields or remove existing fields. Fields 302 can be shown simultaneously as part of a single add new task window 300, or alternatively, fields 302 can appear sequentially, one after another within one or more windows 300. Upon entry of data into fields 302, user 100 can make named party 292 active by selecting or activating an active indicator 304. An active name 292 is a name that can be assigned tasks, while a non-active or inactive name is not available to be assigned new tasks 234. User 100 can also save changes entered for the new name 292, for example, by activating save button 306. Additionally, user 100 can also activate reset button 308 to clear the contents of fields 302 within window 300, or to return reset data entered for a given name or assignment from a current condition to a previous condition such as a default condition.

FIG. 5C provides an example of additional detail for how user 100 can edit an existing named party 292 such as an employee. As indicated above, user 100 can activate or click on edit name icon 294, which can cause edit employee window 309 to appear. Edit employee window 309 allows user 100 to edit or change information for the selected name 292, including information added to fields or data entry points 310, which can include, without limitation, a name, e-mail address, position, physical or mailing address, and phone number(s) for home, office, or mobile telephones. Fields 310 can be pre-programmed or can be customizable by user 100 to change the pre-programmed content to add new fields or remove existing fields. Fields 310 can be shown simultaneously as part of a single edit employee window 309, or alternatively, fields 310 can appear sequentially, one after another within one or more windows 309.

Upon entry of data into fields 310, user 100 can make edited party 292 active by selecting or activating an active indicator 312. Upon entry of data into fields 310, user 100 can save the changes for the edited employee name 292, for example, by activating save button 314.

Figure 6C:
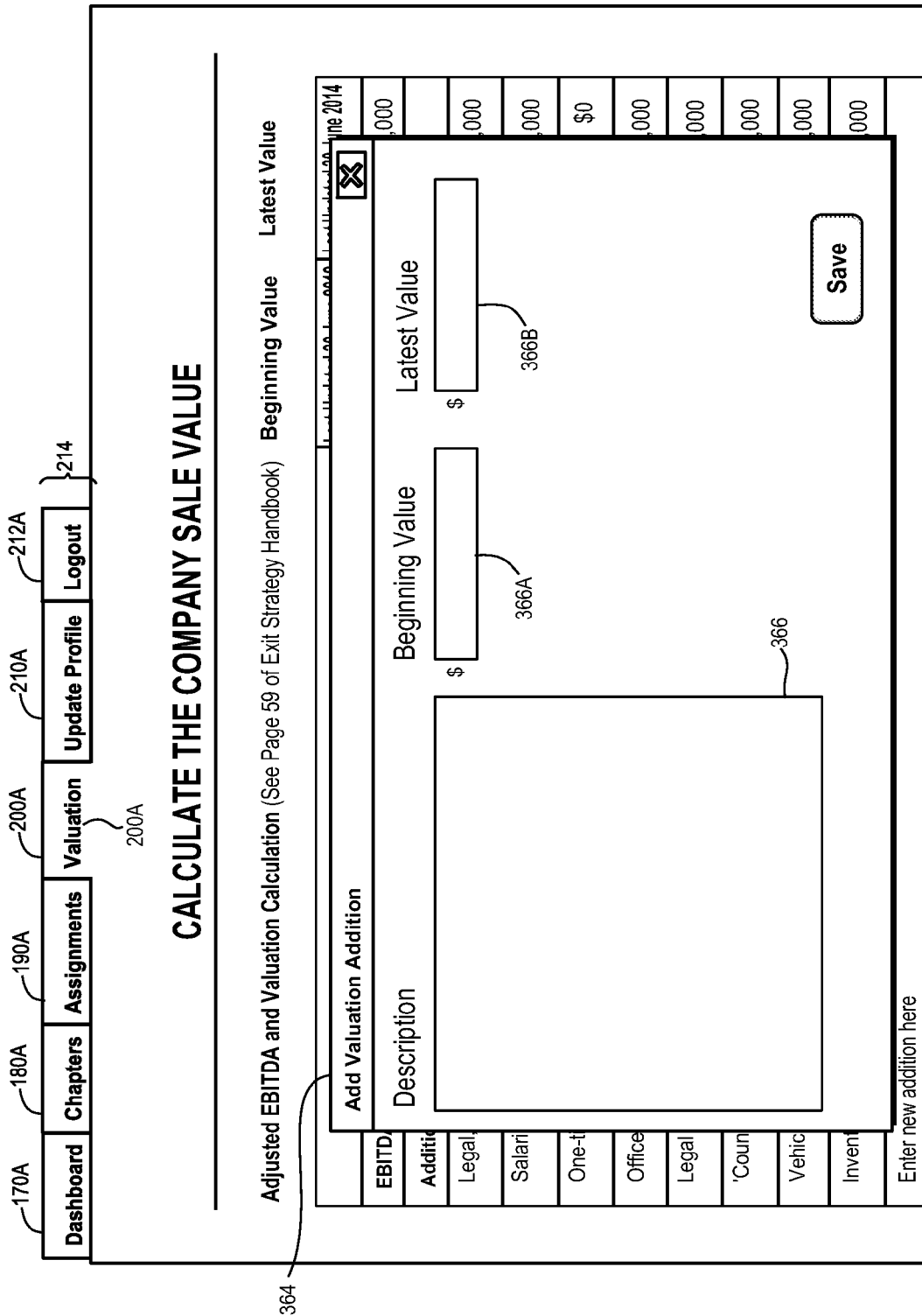

FIGS. 6A-6D provide additional detail with respect to valuation component 200 indicated previously in FIG. 2. Valuation component 200 can be accessed by user 100 from tabs 214 to edit the valuation calculator for a business or company. As shown in FIG. 6A, valuation component 200 can show data used to calculate a value of the company. While any method of calculation can be used in calculating value of a company, FIGS. 6A-6D provide a non-limiting example of an accounting practice for determining company value based on an Earnings Before Interest Taxes Depreciation and Amortization (EBITDA) 320 analysis. However, a person having ordinary skill in the art will recognize that other valuation methods can be used, such as a Discounted Cash Flow Method, a Comparable Company Method of Valuation, a Comparable Transaction Method of Valuation, an Asset Accumulation Method, an Acquisition Debt Value, a Liquidation Value, or other suitable method. EBITDA 320 analysis is presented in greater detail below, because for a Private Equity Group (PEG) or other buyer, a main indicator of value can be an EBITDA analysis. An EBITDA 320 analysis can also allow buyers a standardized or fair valuation that can beneficially be used to compare various businesses with each other, even when the various businesses include different operating structures, for example a taxable entity such as a C-Corporation or a pass-through entity such as S-Corporation.

As shown in FIG. 6A, different estimated values for an EBITDA 320, such as an EBITDA beginning value 320a and an EBITDA latest value 320b, can be calculated and displayed as part of valuation component 200. EBITDA 320 can also be adjusted or changed by user 100 using edit function 320c, as discussed in greater detail below with respect to FIG. 6B. While the modifications performed for valuation component 200 are, for convenience, discussed with respect to actions taken by user 100, the modifications performed within computer-based component 144 can likewise be performed by a party authorized or assigned by user 100, such as a person named in list of names 290. Both EBITDA beginning value 320a and EBITDA latest value 320b can be calculated directly from company records, such as balance sheets, tax records, or other suitable documents. For EBITDAs 320, the values or inputs obtained from company records can be considered at face value, without further regard for how each value was obtained, or what assumptions are included in arriving at each input value. As discussed below, additional consideration can be subsequently given to the assumptions and inputs used for arriving at EBITDA 320 when calculating an adjusted EBITDA 321. Calculating an adjusted EBITDA 321 can be beneficial by eliminating factors that are, or could be perceived as, distortions to the EBITDA and raise questions for potential buyers. Adjusted EBITDA 321 can be calculated by considering the assumptions and inputs used for arriving at EBITDA 320 and making additions 322 and deductions 323 to EBITDA 320 to compensate for factors or assumptions that exist for the business or company as presently operated, but that might not continue forward under new ownership.

Valuation component 200 and written component 143 can include a number of items to be considered by user 100 in making additions 322 and deductions 323 to EBITDA 320 in order to arrive at a relevant or valid Adjusted EBITDA 321. Additionally, user 100 can rely on recommendations from professionals or experts as to what additions 322 and deductions 323 to make. Recommendations from professionals can be beneficial to user 100, because proper identification of adjustments to the EBITDA 320 can be a difficult part of using an EBITDA 320 valuation method. User 100 can obtain recommendations for adjusting EBITDA 320 by using assignment component 190 and consulting list 290 of names 292 as described above with respect to FIGS. 5A-5C.

Adjusted EBITDA 321 can be adjusted to remove expenses and revenue that will no longer be carried forward to a new buyer after the business is sold. Additions 322 and deductions 323 for a closely held family business can be substantial and represent an important consideration in correctly accounting for value in a company, especially before optimizing a selling price of the company. A number of illustrations are included herein as examples of how additions 322 and deductions 323 might produce changes to adjusted EBITDA 321. First, as an illustration of how an adjustment could decrease EBITDA 320, consider a case in which an income statement is reviewed to discover if an owner or manager has been deducting a salary. If the owner or manager has not been deducting a salary, but instead has been compensated from profits, a buyer or future owner that will need to hire a manager will lower his offer to the company by the cost of a salary or compensation package for a new manager, because the salary for the new manager will be an additional company expense that is not reflected in EBITDA 320. Thus, by reducing EBITDA 320 by the cost of the manager's salary, adjusted EBITDA 321 more correctly reflects the value of the company for the buyer.

Second, as an illustration of how an adjustment could increase EBITDA 320, consider a case in which an income statement is reviewed to discover if an employee is being overpaid. If nepotism exists within the company and a son of the owner or manager has been receiving a salary or compensation package without producing value for the company, then a buyer or future owner will not need to continue paying the salary of the son of the owner or manager, which will not be a continuing company expense after the sale of the company and has not been reflected in EBITDA 320. Thus, by increasing EBITDA 320 by the cost of the manager's son's salary, adjusted EBITDA 321 more correctly reflects the value of the company for the buyer. Some business owners can become creative in writing off personal expenses in the company's Income Statement, and these personal expenses should be accounted for in the adjusted EBITDA 321.

A non-exhaustive list of potential discretionary items in an income statement that may be used as adjustments to EBITDA 320 to arrive at a more objective adjusted EBITDA 321 is included below as suggested items for user 100 to consider when making additions 322 and deductions 323 to EBITDA 320. A similar list can be included within valuation component 200 or written component 143 as a ready reference for user 100. Discretionary items to be considered in calculating adjusted EBITDA 320 can include, without limitation: excessive compensation to owners, management and employees; personal legal costs, such as legal costs for estate planning, divorce, or personal litigation; no income or below-market income to owners and management; tuition and educational expenses for children and family members; cash donations to charitable organizations; golf, country club, or other similar expenses not necessary to the business; nepotism expenses such as salary, automobiles, computers, or vacations; vacations or other related party travel expenses, such as time-share expenses; multiple vehicles or unusual vehicle expenses for the owner or others close to the owner such as the owner's family; excessive insurance to owners and related parties, such as excessive life, health, and disability insurance; building rent paid to an owner that is more or less than market value; equipment leases paid to an owner that are more or less than market value; tickets for entertainment, such as for professional sports, that are not necessary for the business; rental expenses or repairs that would normally be paid by a landlord; expenses for hobbies such as buying jewelry, antique cars, or similar items; below-market transfers of assets to related parties or family members; discounted or sales prices to related parties, friends, or others; costs paid in excess of market to vendors that are related parties or friends; discounts or free delivery given to related parties or friends; repairs, remodeling, maintenance, insurance or other expenses for a personal residence; inventory or scrap sold in cash and not deposited into the company's bank account; alimony or child-support payments made by the company; and bonuses or other perks that are above-market costs.

In addition to the discretionary items listed above, additional adjustments to EBITDA 320 can include one-time, non-recurring, or unusual expenses for arriving at a more objective adjusted EBITDA 321. A sample list of one-time, non-recurring, or unusual expenses is included below as suggested items for user 100 to consider when making additions 322 and deductions 323 to EBITDA 320. A similar list can be included within valuation component 200 or written component 143 as a ready reference for user 100 to consult when making adjustments to EBITDA 320. A non-exhaustive list of examples of one-time, nonrecurring, or unusual expenses included in adjusted EBITDA 321 can include, without limitation: maintenance capital expenditures; information technology (IT) capital expenditures; write-off of an unproductive or obsolete asset; unusual, one-time or prior period adjustments proposed by independent certified public accountants (CPAs); legal expenses incurred for preparing a business for sale; legal costs of restructuring or reorganization; audit, appraisal, or consulting fees for selling a business; litigation expenses that have concluded and are nonrecurring; costs for exits of minority owners prior to sale of a company; insurance claims; opening a new facility; writing off inventory that is unusual or nonrecurring; unusual bad-debt expenses, such as a Chapter 11 bankruptcy filing by a customer; employment costs, such as large severance or other nonrecurring expenses; large and unusual bonuses or other compensation paid for nonrecurring transactions; differences between book and tax depreciation; professional fees, such as creating a Defined Contribution or Benefit Plan; leases that were expensed instead of being capitalized; equipment that was expensed instead of being capitalized; and one-time marketing, branding, public relations, or research costs.

In the example illustrated in FIG. 6A, various potential discretionary items as well as one-time, nonrecurring, or unusual expenses, are included as additions 322 and deductions 323 within valuation component 200. More specifically, examples of additions 322 include: legal, reorganization, audit and appraisal costs to prepare for the sale of the business 324 comprising an estimated beginning value 324a of $10,000 and an estimated latest value 324b of $105,000; salaries of family members who are not expected to continue working for the buyer 326 comprising an estimated beginning value 326a of $125,000 and an estimated latest value 326b of $135,000; one-time bonuses paid for a nonrecurring and unusual transaction 328 comprising an estimated beginning value 328a of $75,000 and an estimated latest value 328b of $0; officer life and disability insurance that will not continue after the sale 330 comprising an estimated beginning value 330a of $25,000 and an estimated latest value 330b of $30,000; legal and other costs to buy out minority owners of the company 332 comprising an estimated beginning value 332a of $80,000 and an estimated latest value 332b of $70,000; country club fees and season tickets to the Chicago Cubs 334 comprising an estimated beginning value 334a of $25,000 and an estimated latest value 334b of $30,000; vehicles, education, and other expenses for three family members 336 comprising an estimated beginning value 336a of $45,000 and an estimated latest value 336b of $55,000; and inventory or scrap sold in cash and not deposited into the company's bank account 338 comprising an estimated beginning value 338a of $0 and an estimated latest value 338b of $50,000.

As shown in FIG. 6A, each line item 324-338 within additions 322 can also include an edit function 324c-338c, respectively. Edit function 324c-338c can be included as an icon, hyperlink, or other graphical user interface (GUI) within valuation 220, and can be conveniently grouped near or with line items 324-338. Use of edit functions 324c-338c are discussed in greater detail below with respect to FIG. 6D.

FIG. 6A further shows a new additions function 340 can be included as an icon, hyperlink, or other GUI within valuation component 200, and can be conveniently grouped with additions 322, such as following line items 324-338 described above. New additions function 340 allows user 100 to add a new addition 322 into valuation component 200.

Various potential discretionary items as well as one-time, nonrecurring, or unusual expenses, can be included as deductions 322 within valuation component 200. More specifically, examples of deductions 323 include: increase in the cost of the person that will replace the owner/manager 344 comprising an estimated beginning value 344a of $50,000 and an estimated latest value 344b of $60,000; rent paid to the owner below market value for an equivalent building 346 comprising an estimated beginning value 346a of $45,000 and an estimated latest value 346b of $0; below-market salaries paid to key employees that are expected to continue with the buyer 348 comprising an estimated beginning value 348a of $40,000 and an estimated latest value 348b of $15,000; and excessive compensation to owners, management, and employees 350 comprising an estimated beginning value 350a of $25,000 and an estimated latest value 350b of $10,000.

As shown in FIG. 6A, each line item 344-350 included as a deduction 323 can also include an edit function 344c-350c, respectively. Edit functions 344c-350c can be included as icons, hyperlinks, or other GUIs within valuation 220, and can be conveniently grouped near or with line items 344-350. Use of edit functions 344c-350c are similar to the use of edit functions 324c-33ac for additions discussed below with respect to FIG. 6D.

FIG. 6A further shows new deductions function 352 can be included as an icon, hyperlink, or other GUI within valuation component 200, and can be conveniently grouped with deductions 323, such as following line items 344-350 described above. New deductions function 352 allows user 100 to add a new deduction 323 into valuation component 200. Accordingly, user 100 can customize valuation component 200 and EBITA 320 for both EBITDA beginning value 321a and EBITDA latest value 321b to arrive at an adjusted beginning value 356a and adjusted latest value 356b for adjusted EBITDA 356.

As illustrated by the exemplary values in valuation component 200 shown in FIG. 6A, EBITDA beginning value 320a ($74,014) is increased by values 324a-338a and decreased by values 344a-350a to arrive at the value of adjusted EBITDA beginning value 356a ($299,014). Similarly, EBITDA latest value 320b ($400,000) is increased by values 324b-338b and decreased by values 344b-350b to arrive at the value of adjusted EBITDA latest value 356b ($790,000). As discussed above, adjusted EBITDA 356 is a better approximation for company earnings than EBITDA 320; however, EBITDA 320 and adjusted EBITDA 356 still do not accurately reflect an actual value, either beginning or latest, of the company being considered. In order to arrive at a good approximation of the value of the company being considered, adjusted EBITDA 356 is multiplied by a multiplier 358.

Multiplier 358 is a scalar factor used for converting a company's adjusted EBITDA 356, which represents a year of a company's performance, to arrive at an overall estimated value 359 for the business, which is also known as an "enterprise value." Multiplier 358 will almost always be greater than one, because a company's value will almost always be greater than its earnings or EBITDA for a year. As a going concern, a company will almost always continue to generate additional revenue for more than a single year, and as such, estimated value 359 will be best reflected by a multiple of adjusted EBITDA 356, as represented by multiplier 358. Multiplier 358 is determined by user 100 according to specific characteristics of the company and the nature of the buyer for the company. For financial buyers, multiplier 358 typically ranges from 4-6, indicating the estimated value 359 of the company is 4-6 times the company's adjusted EBITDA 356. In some instances, such as whether the company is being sold in is a "buyer's market" or a "seller's market," multiplier 358 can be a value less than 4 or greater than 6. Multiplier 358 is typically greater than 6 for strategic buyers rather than financial buyers. In instances where a company is being acquired by a strategic buyer, multiplier 358 can be as high as 20 or more.

Factors to be considered in determining an appropriate multiplier 358 include multipliers derived from comparable company valuations, and multipliers applicable to public companies in a same industry. For example, if a public company in the same industry as the company being sold has a total market valuation (based on its stock price) that is 10 times its EBITDA, then multiplier 358 could be assigned an initial value of 10 as a starting point in determining the appropriate multiplier. The initial value of multiplier 358 can also undergo a number of additions and deductions, similar to the adjustments undergone by EBITA 320, to arrive at adjusted EBITDA 256. For example, multiplier 358 can also be adjusted to account for a larger or smaller company size and a corresponding larger or smaller market dominance. As another non-limiting example, author Rick Rickersten has proposed the following multiplier values for multipliers based on the nature of the buying party: for a strategic buyer, select as a multiplier starting value in a range of 8-10; for a private equity or financial buyer, select as a multiplier starting value in a range of 6-8; for a management buyout, select as a multiplier starting value in a range of 5-7; and for an employee stock ownership plan (ESOP), select as a multiplier starting value in a range of 5-6.

As shown in FIG. 6A, during valuation component 200, user 100 can select beginning value multiplier 358a, and latest value multiplier 358b, which can be the same or different from the beginning value multiplier. Estimated value 359 of the company is then the product of adjusted EBITDA 356 and multiplier 258. FIG. 6A includes the non-limiting examples of adjusted EBITDA beginning value 356a ($299,014) multiplier by beginning multiplier 358a (4) to arrive at an estimated beginning value 218 ($1,196,056). Similarly, FIG. 6A also includes the non-limiting examples of adjusted EBITDA latest value 356b ($790,000) multiplied by latest multiplier 358b (4) to arrive at an estimated latest value 220 ($3,160,00). A difference between beginning estimated value 218 and latest estimated company value 220 (or in other words an increase or appreciation in the value of the company) can be calculated and displayed as difference 222 as part of valuation component 200 and as a feature or component within dashboard or homepage component 170. By tracking and controlling difference 222, computer-based component 144 can operate as a system or method for authorizing sale of the company when multiplier 358 reflects an actual buyer.

FIG. 6B shows a view of valuation component 200, similar to the view presented in FIG. 6A. FIG. 6B additionally shows Edit Valuation window 360 that can appear as a window, tab, page, link, or other suitable form to allow user 100 to input, change, or edit values for beginning value 320a and latest value 320b. Alternatively, edit valuation window 360 can allow for editing data directly within a cell or an area in which beginning value 320a and latest value 320b are shown without showing or creating an additional window, tab, page, link, or other form. Edit valuation window 360 that can appear as a result of activating EBITDA edit function 320c, such as by clicking an icon. In other instances, user 100 can freely edit information within valuation component 200, including beginning value 320a and latest value 320b, without first activating an edit function such as EBITDA edit function 320c. Changes to valuation component 200, after input by user 100, can also be manually or automatically saved.

FIG. 6C shows a view of valuation component 200, similar to the view presented in FIG. 6A. FIG. 6C additionally shows add valuation addition window 364 that can appear as a window, tab, page, link, or other suitable form to allow user 100 to input or add various potential discretionary items as well as one-time, nonrecurring, or unusual expenses, that can be included as additions 322 within valuation component 200, as described previously with respect to FIG. 6A. Add valuation addition window 364 that can appear as a result of activating new additions function 340, such as by clicking an icon. Add valuation addition window 364 can include a description field 366, a beginning value field 366a, and a latest value field 366b. Description field 366 can be configured to receive a description or identifier of various potential discretionary items as well as one-time, nonrecurring, or unusual expenses. Beginning value field 366a and latest value field 366b can be incorporated directly from company records, such as balance sheets, tax records, or other suitable documents. Alternatively, add valuation addition window 364 can allow for editing data directly within a cell or an area near or adjacent to additions 324-338, such as by inputting data at new additions function 340, without showing or creating an additional window, tab, page, link, or other form. Thus, in some instances, user 100 can freely add information within valuation component 200, including description 366, beginning value 366a, and latest value 366b. Changes to valuation component 200 can also be manually or automatically saved, after they are input by user 100.

While the details of FIG. 6C are presented with respect to add valuation addition window 364, the same discussion is equally applicable to an add deduction window that can appear as a result of activating new deductions function 352.

Figure 6D:
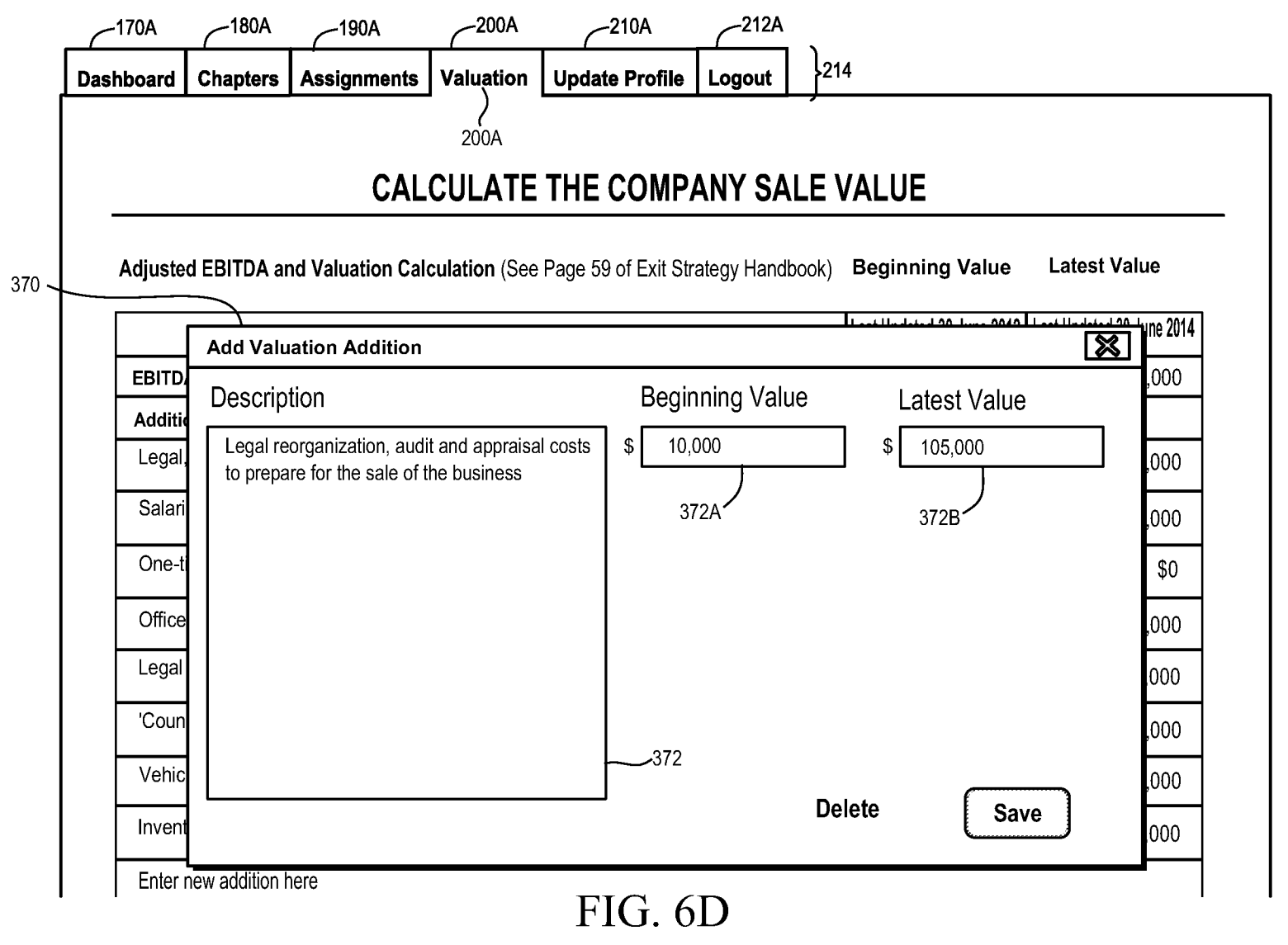

FIG. 6D shows a view of valuation component 200, similar to the view presented in FIG. 6A. FIG. 6D additionally shows edit addition window 370 that can appear as a window, tab, page, link, or other suitable form to allow user 100 to edit previously input additions 322 or deductions 323. Edit addition window 370 can appear as a result of activating any of edit function 324c-338c, such as by clicking an icon. Edit addition window 370 can include a description field 372, a beginning value field 372a, and a latest value field 372b. Description field 372 can correspond to any of the descriptions for line items 324-338, just as beginning value field 372a, and a latest value field 372b can correspond to any of value fields 324a-338a or 324b-338b, respectively. Description field 372 can be used by user 100 to edit, change, or modify a description previously entered. Similarly, beginning value field 372a, and a latest value field 372b can be used by user 100 to edit, change, or modify a value previously entered. Alternatively, edit addition window 370 can allow for editing data directly within a cell such as line items 324-338, value fields 324a-338a, or value fields 324b-338b, by modifying an existing entry without showing or creating an additional window, tab, page, link, or other form. Thus, in some instances, user 100 can freely edit information within valuation component 200, with or without first activating an edit function such as edit functions 324-338. Changes to valuation component 200 can also be manually or automatically saved, after they are input by user 100.

While the details of FIG. 6D are presented with respect to edit addition window 370, the same discussion is equally applicable to an edit deduction window that can appear as a result of activating edit deductions function 344c-350c.

Update profile component 210 and logout component 212 can likewise be accessed by user 100 by using links or other suitable connection to profile update component 210a and logout component 212a as described above with respect to components 170, 180, 190, and 200. Within update profile component 210, user 100 can add or edit desired information such as a company name, a user name, an e-mail address, a password, a partner, a CEO or owner, a contact person, a mailing address, business address, or both, including a state, city, zip code, phone number, and logo. Changes to update profile component 210, after input by user 100, can also be manually or automatically saved. Within logout component 212a, user 100 can securely logout from computer-based component 144.

One of skill in the art will recognize that the methods of the present invention described above may be implemented as one or more software processes executable by one or more processors, one or more firmware applications, or both. The processes, firmware, or both are configured to operate on one or more general purpose microprocessors or controllers, a field programmable gate array (FPGA), an application specific integrated circuit (ASIC), or other hardware capable of performing the actions describe above. In an exemplary embodiment of the present invention, software processes are executed by a CPU in order to perform the actions of the present invention. Additionally, the present invention is not described with reference to any particular programming language. It will be appreciated that a variety of programming languages may be used to implement the teachings of the invention as described herein.

It is also to be understood that the methods may be employed with any form of memory device including all forms of sequential, pseudo-random, and random access storage devices. Storage devices as known within the current art include all forms of random access memory, magnetic and optical tape, magnetic and optical disks, along with various other forms of solid-state mass storage devices. The current invention applies to all forms and manners of memory devices including, but not limited to, storage devices utilizing magnetic, optical, and chemical techniques, or any combination thereof.

It is to be understood that the disclosure is not limited to the exact details of construction, operation, exact materials, or embodiments shown and described, as obvious modifications and equivalents will be apparent to one skilled in the art without departing from the spirit thereof and that these implementations may be applied to other embodiments of mode-based social networking systems and methods.

What is claimed is:

1. A method for controlling a sale of a company at a target company sale value, comprising:
    storing in a database:
        the target company sale value,
        a beginning company value based on an Earnings Before Interest Taxes Depreciation and Amortization (EBITDA) analysis, and
        a multiplier;
    a user or business owner generating a list of tasks from a plurality of checklists, the plurality of checklists comprising:
        a general information checklist,
        a management and employees checklist,
        a product and service lines checklist,
        a competition checklist,
        a customer information checklist,
        a key vendors and service providers checklist,
        tasks on an intellectual property and intangible assets checklist,
        a technology software and hardware checklist,
        a marketing branding and public relations checklist,
        a related parties and minority owners checklist,
        an insurance checklist,
        on an internal financial information checklist,
        an inventory checklist,
        an external financial statements checklist,
        a contracts and leases checklist,
        a litigation and claims checklist,
        tasks on a taxes checklist, and
        tasks on an environmental checklist;
    generating through a computerized user device:
        a list of assignments generated by the user for named third parties to complete tasks from the lists of tasks, wherein completing the list of assignments increases the beginning company value to a current company value, and
        a dashboard;
    connecting to the list of assignments through a hyperlink on the dashboard for updating the list of assignments and to view real time additions and deductions in value to the current company value resulting from the named third parties completing at least a portion of the list of assignments;
    displaying in real time by the dashboard of the computerized user device:
        the current company value, wherein the current company value is a product of an adjusted EBITDA company value and the multiplier, wherein the adjusted EBITDA company value comprises the beginning company value adjusted by the additions and deductions in value resulting from the named third parties completing assignments from the list of assignments, active status updates of the list of assignments to the user showing how complete each assignment in the list of assignments is, descriptive material on the computerized user device for the user to receive the active status updates for each assignment by the third parties in the list of assignments, which are accessible by following hyperlinks, progress in reducing a difference between the target company sale value and the current company value as the at least a portion of the list of assignments is completed, and authorization for sale of the company when the target company sale value equals a current company value; and selling the company for at least the target company sale value after the dashboard displays the authorization for sale of the company.

2. The method of claim 1, further comprising receiving reports from the named parties with respect to the list of assignments to complete the tasks from within the plurality of checklists.

3. The method of claim 1, further comprising:
receiving by the computerized user device an adjustment to the multiplier based on a potential buyer; and
displaying on the dashboard authorization for sale of the company when the multiplier used reflects an actual buyer.

4. A method for controlling sale of a company at a target company value, comprising:
storing in a database:
the target company sale value,
a beginning company value based on an Earnings Before Interest Taxes Depreciation and Amortization (EBITDA) analysis, and, and
a multiplier;
generating through a computerized user device a list of assignments for named parties to complete tasks, wherein completing at least a portion of the list of assignments increases the beginning company value to a current company value, and
a dashboard;
connecting to the list of assignments through a hyperlink on the dashboard for updating the list of assignments and to view real time additions and deductions in value to the current company value resulting from completing the at least a portion of the list of assignments;
displaying in real time by the dashboard of the computerized user device:
the current company value, wherein the current company value is a product of an adjusted EBITDA company value and the multiplier, wherein the adjusted EBITDA company value comprises the beginning company value adjusted by the additions and deductions in value resulting from completing assignments from the list of assignments, progress in reducing a difference between the target company sale value and the current company value as the at least a portion of the list of assignments is completed, and authorization for sale of the company when the target company sale value equals a current company value; and selling the company for at least the target company sale value after the dashboard displays the authorization for sale of the company.

5. The method of claim 4, wherein generating the list of assignments comprises generating a list of tasks from:
a general information checklist;
a management and employees checklist;
a product and service lines checklist;
a competition checklist;
a customer information checklist;
a key vendors and service providers checklist;
an intellectual property and intangible assets checklist;
a technology software and hardware checklist;
a marketing branding and public relations checklist;
a related parties and minority owners checklist;
an insurance checklist;
an internal financial information checklist;
an inventory checklist;
an external financial statements checklist;
a contracts and leases checklist;
a litigation and claims checklist;
a taxes checklist; and
an environmental checklist.

6. The method of claim 5, further comprising:
storing the plurality of checklists on the database;
connecting to the list of assignments through a hyperlink on the dashboard to receive assignments of named parties to complete tasks from within the plurality of checklists by a completion date; and
displaying in real time an increase in the beginning company value to the current company value based on completion of the assigned tasks.

7. The method of claim 6, wherein the computerized user device is configured to receive reports from the named parties with respect to the assignments to complete the tasks from within the plurality of checklists.

8. The method of claim 6, wherein the dashboard is configured to display:
active status updates of the tasks; and
links to descriptive material that corresponds to the active status updates of the tasks.

9. The method of claim 4, wherein the computerized user device is configured to:
receive an adjustment to the multiplier based on a potential buyer; and
display on the dashboard authorization for sale of the company when the multiplier used reflects an actual buyer.

* * * * *